(12) United States Patent
Shibayama et al.

(10) Patent No.: US 12,019,700 B2
(45) Date of Patent: Jun. 25, 2024

(54) SIGNAL PROCESSING APPARATUS, METHOD, PROGRAM, AND RECORDING MEDIUM

(71) Applicant: NEC Corporation, Tokyo (JP)

(72) Inventors: Atsufumi Shibayama, Tokyo (JP); Hajime Yamagiwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 791 days.

(21) Appl. No.: 17/057,082

(22) PCT Filed: May 21, 2019

(86) PCT No.: PCT/JP2019/020041
§ 371 (c)(1),
(2) Date: Nov. 19, 2020

(87) PCT Pub. No.: WO2019/225576
PCT Pub. Date: Nov. 28, 2019

(65) Prior Publication Data
US 2021/0342102 A1    Nov. 4, 2021

(30) Foreign Application Priority Data
May 22, 2018  (JP) ................................ 2018-097761

(51) Int. Cl.
*G06F 17/14*  (2006.01)
(52) U.S. Cl.
CPC .................................. *G06F 17/142* (2013.01)
(58) Field of Classification Search
CPC ............... H03M 7/04–14; H03M 7/24; G06F 17/141–142; G06F 17/156; G06F 17/16; G06F 7/24
See application file for complete search history.

(56) References Cited

U.S. PATENT DOCUMENTS 4,520,347 A * 5/1985 Campbell, Jr. ......... H03M 7/04
                                                                        377/41
4,841,467 A * 6/1989 Ho .......................... G06F 7/485
                                                                       708/501
(Continued)

FOREIGN PATENT DOCUMENTS

JP      H04-281518 A    10/1992
JP      H08-137832 A     5/1996
(Continued)

OTHER PUBLICATIONS

Masaichi, JP 2003011415 (translation version), Aug. 19, 2001, p. 3-18, figures 1-11 (Year: 2001).*

(Continued)

*Primary Examiner* — Jyoti Mehta
*Assistant Examiner* — Huy Duong

(57) ABSTRACT

A signal processing apparatus includes a storage processing part that performs storage processing on data represented in a second representation format, wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted, and an operation processing part that performs operation processing on at least any one of data represented in the two's complement representation or data obtained by applying compensation processing to data represented in the second representation format.

10 Claims, 30 Drawing Sheets

(56) References Cited

U.S. PATENT DOCUMENTS

| | | | | |
|---|---|---|---|---|
| 5,148,161 | A * | 9/1992 | Sako | H03M 7/24 |
| | | | | 377/41 |
| 5,379,038 | A * | 1/1995 | Matsumoto | H03M 9/00 |
| | | | | 341/101 |
| 2005/0071403 | A1 * | 3/2005 | Taunton | G06F 9/30007 |
| | | | | 712/E9.035 |
| 2010/0002572 | A1 * | 1/2010 | Garrett | H04L 27/2682 |
| | | | | 370/210 |
| 2015/0363360 | A1 * | 12/2015 | Shibayama | G06F 17/142 |
| | | | | 708/404 |
| 2016/0140083 | A1 * | 5/2016 | Shibayama | G06F 17/156 |
| | | | | 708/300 |
| 2017/0083479 | A1 * | 3/2017 | Ahn | G06F 7/00 |

FOREIGN PATENT DOCUMENTS

| | | |
|---|---|---|
| JP | 2001-56806 A | 2/2001 |
| JP | 2001-100979 A | 4/2001 |
| JP | 2001-306547 A | 11/2001 |
| JP | 2003-101415 A | 4/2003 |
| JP | 2003-143040 A | 5/2003 |
| JP | 2005-184310 A | 7/2005 |
| JP | 2008-242594 A | 10/2008 |
| JP | 2012-22500 A | 2/2012 |

OTHER PUBLICATIONS

International Search Report dated Jul. 16, 2019, in corresponding PCT International Application.

J.W. Cooley et al., "An Algorithm for the Machine Calculation of Complex Fourier Series," Mathematics of Computation, US, American Mathematical Society, Apr. 1965, vol. 19, No. 90, pp. 297-301, (1965).

D.P. Kolba, "A Prime Factor FFT Algorithm Using High-Speed Convolution," IEEE Trans. On Acoustics, US, IEEE Signal Processing Society, Aug. 1977, vol. 29, No. 4, pp. 281-294, (1977).

* cited by examiner

FIG. 2

|  | 2'S COMPLEMENT | SIGN MAGNITUDE | SIGN MAGNITUDE-- |
|---|---|---|---|
| +15 | 01111 | 01111 | 01111 |
| +14 | 01110 | 01110 | 01110 |
| +13 | 01101 | 01101 | 01101 |
| +12 | 01100 | 01100 | 01100 |
| +11 | 01011 | 01011 | 01011 |
| +10 | 01010 | 01010 | 01010 |
| +9 | 01001 | 01001 | 01001 |
| +8 | 01000 | 01000 | 01000 |
| +7 | 00111 | 00111 | 00111 |
| +6 | 00110 | 00110 | 00110 |
| +5 | 00101 | 00101 | 00101 |
| +4 | 00100 | 00100 | 00100 |
| +3 | 00011 | 00011 | 00011 |
| +2 | 00010 | 00010 | 00010 |
| +1 | 00001 | 00001 | 00001 |
| 0 | 00000 | 00000 / 10000 | 00000 |
| −1 | 11111 | 10001 | 10000 |
| −2 | 11110 | 10010 | 10001 |
| −3 | 11101 | 10011 | 10010 |
| −4 | 11100 | 10100 | 10011 |
| −5 | 11011 | 10101 | 10100 |
| −6 | 11010 | 10110 | 10101 |
| −7 | 11001 | 10111 | 10110 |
| −8 | 11000 | 11000 | 10111 |
| −9 | 10111 | 11001 | 11000 |
| −10 | 10110 | 11010 | 11001 |
| −11 | 10101 | 11011 | 11010 |
| −12 | 10100 | 11100 | 11011 |
| −13 | 10011 | 11101 | 11100 |
| −14 | 10010 | 11110 | 11101 |
| −15 | 10001 | 11111 | 11110 |
| −16 | 10000 |  | 11111 |

FIG. 15

← CYCLE

| 8 | 7 | 6 | 5 | 4 | 3 | 2 | 1 | |
|---|---|---|---|---|---|---|---|---|
| P8 | P7 | P6 | P5 | P4 | P3 | P2 | P1 | |
| 56 | 48 | 40 | 32 | 24 | 16 | 8 | 0 | ps(0) |
| 57 | 49 | 41 | 33 | 25 | 17 | 9 | 1 | ps(1) |
| 58 | 50 | 42 | 34 | 26 | 18 | 10 | 2 | ps(2) |
| 59 | 51 | 43 | 35 | 27 | 19 | 11 | 3 | ps(3) |
| 60 | 52 | 44 | 36 | 28 | 20 | 12 | 4 | ps(4) |
| 61 | 53 | 45 | 37 | 29 | 21 | 13 | 5 | ps(5) |
| 62 | 54 | 46 | 38 | 30 | 22 | 14 | 6 | ps(6) |
| 63 | 55 | 47 | 39 | 31 | 23 | 15 | 7 | ps(7) |

FIG. 16

← CYCLE

| 8 | 7 | 6 | 5 | 4 | 3 | 2 | 1 | |
|---|---|---|---|---|---|---|---|---|
| Q8 | Q7 | Q6 | Q5 | Q4 | Q3 | Q2 | Q1 | |
| 7 | 6 | 5 | 4 | 3 | 2 | 1 | 0 | qs(0) |
| 15 | 14 | 13 | 12 | 11 | 10 | 9 | 8 | qs(1) |
| 23 | 22 | 21 | 20 | 19 | 18 | 17 | 16 | qs(2) |
| 31 | 30 | 29 | 28 | 27 | 26 | 25 | 24 | qs(3) |
| 39 | 38 | 37 | 36 | 35 | 34 | 33 | 32 | qs(4) |
| 47 | 46 | 45 | 44 | 43 | 42 | 41 | 40 | qs(5) |
| 55 | 54 | 53 | 52 | 51 | 50 | 49 | 48 | qs(6) |
| 63 | 62 | 61 | 60 | 59 | 58 | 57 | 56 | qs(7) |

FIG. 20

← CYCLE

| 8 | 7 | 6 | 5 | 4 | 3 | 2 | 1 | |
|---|---|---|---|---|---|---|---|---|
| P8 | P7 | P6 | P5 | P4 | P3 | P2 | P1 | |
| 56 | 48 | 40 | 32 | 24 | 16 | 8 | 0 | ps(0) |
| 57 | 49 | 41 | 33 | 25 | 17 | 9 | 1 | ps(1) |
| 58 | 50 | 42 | 34 | 26 | 18 | 10 | 2 | ps(2) |
| 59 | 51 | 43 | 35 | 27 | 19 | 11 | 3 | ps(3) |
| 60 | 52 | 44 | 36 | 28 | 20 | 12 | 4 | ps(4) |
| 61 | 53 | 45 | 37 | 29 | 21 | 13 | 5 | ps(5) |
| 62 | 54 | 46 | 38 | 30 | 22 | 14 | 6 | ps(6) |
| 63 | 55 | 47 | 39 | 31 | 23 | 15 | 7 | ps(7) |

FIG. 21

← CYCLE

| 8 | 7 | 6 | 5 | 4 | 3 | 2 | 1 | |
|---|---|---|---|---|---|---|---|---|
| P8 | P7 | P6 | P5 | P4 | P3 | P2 | P1 | |
| 14 | 6 | 12 | 4 | 10 | 2 | 8 | 0 | ps(0) |
| 15 | 7 | 13 | 5 | 11 | 3 | 9 | 1 | ps(1) |
| 30 | 22 | 28 | 20 | 26 | 18 | 24 | 16 | ps(2) |
| 31 | 23 | 29 | 21 | 27 | 19 | 25 | 17 | ps(3) |
| 46 | 38 | 44 | 36 | 42 | 34 | 40 | 32 | ps(4) |
| 47 | 39 | 45 | 37 | 43 | 35 | 41 | 33 | ps(5) |
| 62 | 54 | 60 | 52 | 58 | 50 | 56 | 48 | ps(6) |
| 63 | 55 | 61 | 53 | 59 | 51 | 57 | 49 | ps(7) |

FIG. 22

| | t0 | t1 | t2 | t3 | t4 | t5 | t6 | t7 | t8 | t9 | t10 | t11 | t12 | t13 | t14 | t15 | t16 |
|---|---|---|---|---|---|---|---|---|---|---|---|---|---|---|---|---|---|
| in0 | 0 | 8 | 16 | 24 | 32 | 40 | 48 | 56 | | | | | | | | | |
| in1 | 1 | 9 | 17 | 25 | 33 | 41 | 49 | 57 | | | | | | | | | |
| in2 | 2 | 10 | 18 | 26 | 34 | 42 | 50 | 58 | | | | | | | | | |
| in3 | 3 | 11 | 19 | 27 | 35 | 43 | 51 | 59 | | | | | | | | | |
| in4 | 4 | 12 | 20 | 28 | 36 | 44 | 52 | 60 | | | | | | | | | |
| in5 | 5 | 13 | 21 | 29 | 37 | 45 | 53 | 61 | | | | | | | | | |
| in6 | 6 | 14 | 22 | 30 | 38 | 46 | 54 | 62 | | | | | | | | | |
| in7 | 7 | 15 | 23 | 31 | 39 | 47 | 55 | 63 | | | | | | | | | |
| 205a | 0 | 8 | 22 | 30 | 36 | 44 | 50 | 58 | | | | | | | | | |
| 205b | 1 | 9 | 23 | 31 | 37 | 45 | 51 | 59 | | | | | | | | | |
| 205c | 2 | 10 | 16 | 24 | 38 | 46 | 52 | 60 | | | | | | | | | |
| 205d | 3 | 11 | 17 | 25 | 39 | 47 | 53 | 61 | | | | | | | | | |
| 205e | 4 | 12 | 18 | 26 | 32 | 40 | 54 | 62 | | | | | | | | | |
| 205f | 5 | 13 | 19 | 27 | 33 | 41 | 55 | 63 | | | | | | | | | |
| 205g | 6 | 14 | 20 | 28 | 34 | 42 | 48 | 56 | | | | | | | | | |
| 205h | 7 | 15 | 21 | 29 | 35 | 43 | 49 | 57 | | | | | | | | | |
| 206a | | | | | | | | | 0 | 8 | 50 | 58 | 36 | 44 | 22 | 30 | |
| 206b | | | | | | | | | 1 | 9 | 51 | 59 | 37 | 45 | 23 | 31 | |
| 206c | | | | | | | | | 16 | 24 | 2 | 10 | 52 | 60 | 38 | 46 | |
| 206d | | | | | | | | | 17 | 25 | 3 | 11 | 53 | 61 | 39 | 47 | |
| 206e | | | | | | | | | 32 | 40 | 18 | 26 | 4 | 12 | 54 | 62 | |
| 206f | | | | | | | | | 33 | 41 | 19 | 27 | 5 | 13 | 55 | 63 | |
| 206g | | | | | | | | | 48 | 56 | 34 | 42 | 20 | 28 | 6 | 14 | |
| 206h | | | | | | | | | 49 | 57 | 35 | 43 | 21 | 29 | 7 | 15 | |
| 207a | | | | | | | | | 0 | 8 | 2 | 10 | 4 | 12 | 6 | 14 | |
| 207b | | | | | | | | | 1 | 9 | 3 | 11 | 5 | 13 | 7 | 15 | |
| 207c | | | | | | | | | 16 | 24 | 18 | 26 | 20 | 28 | 22 | 30 | |
| 207d | | | | | | | | | 17 | 25 | 19 | 27 | 21 | 29 | 23 | 31 | |
| 207e | | | | | | | | | 32 | 40 | 34 | 42 | 36 | 44 | 38 | 46 | |
| 207f | | | | | | | | | 33 | 41 | 35 | 43 | 37 | 45 | 39 | 47 | |
| 207g | | | | | | | | | 48 | 56 | 50 | 58 | 52 | 60 | 54 | 62 | |
| 207h | | | | | | | | | 49 | 57 | 51 | 59 | 53 | 61 | 55 | 63 | |
| out0 | | | | | | | | | | 0 | 1 | 2 | 3 | 4 | 5 | 6 | 7 |
| out1 | | | | | | | | | | 8 | 9 | 10 | 11 | 12 | 13 | 14 | 15 |
| out2 | | | | | | | | | | 16 | 17 | 18 | 19 | 20 | 21 | 22 | 23 |
| out3 | | | | | | | | | | 24 | 25 | 26 | 27 | 28 | 29 | 30 | 31 |
| out4 | | | | | | | | | | 32 | 33 | 34 | 35 | 36 | 37 | 38 | 39 |
| out5 | | | | | | | | | | 40 | 41 | 42 | 43 | 44 | 45 | 46 | 47 |
| out6 | | | | | | | | | | 48 | 49 | 50 | 51 | 52 | 53 | 54 | 55 |
| out7 | | | | | | | | | | 56 | 57 | 58 | 59 | 60 | 61 | 62 | 63 |

FIG. 24

| | t0 | t1 | t2 |
|---|---|---|---|
| INPUT in0 | 0 | 8 | |
| INPUT in1 | 1 | 9 | |
| SELECTOR 221 | 0 | 9 | |
| FLIP-FLOP 222 | | 0 | 9 |
| FLIP-FLOP 223 | | 1 | |
| SELECTOR 224 | | 0 | 1 |
| SELECTOR 225 | | 8 | 9 |
| OUTPUT out0 | | 0 | 1 |
| OUTPUT out1 | | 8 | 9 |

FIG. 27

|     | 2'S COMPLEMENT | SIGN MAGNITUDE |
|-----|----------------|----------------|
| +7  | 00000111       | 00000111       |
| +6  | 00000110       | 00000110       |
| +5  | 00000101       | 00000101       |
| +4  | 00000100       | 00000100       |
| +3  | 00000011       | 00000011       |
| +2  | 00000010       | 00000010       |
| +1  | 00000001       | 00000001       |
| 0   | 00000000       | 00000000       |
|     |                | 10000000       |
| -1  | 11111111       | 10000001       |
| -2  | 11111110       | 10000010       |
| -3  | 11111101       | 10000011       |
| -4  | 11111100       | 10000100       |
| -5  | 11111011       | 10000101       |
| -6  | 11111010       | 10000110       |
| -7  | 11111001       | 10000111       |
| -8  | 11111000       | 10001000       |

SIGNAL PROCESSING APPARATUS, METHOD, PROGRAM, AND RECORDING MEDIUM

CROSS-REFERENCE TO RELATED APPLICATIONS

This application is a National Stage Entry of International Application No. PCT/JP2019/020041, filed May 21, 2019. The present invention is based on claiming priority of Japanese Patent Application No. 2018-097761, filed on May 22, 2018. The entire contents of the above-referenced applications are expressly incorporated herein by reference.

FIELD

The present invention relates to a signal processing apparatus, method, program, and recording medium.

BACKGROUND

Fast Fourier transform (hereinafter, called as "FFT" hereinafter) processing is one of important processing in digital signal processing. Further, for example, frequency domain equalization (FDE) is known as a technique that compensates for waveform distortion during signal transmission in wireless or wired communication.

In the frequency domain equalization, time domain signal data is first transformed to frequency domain data by fast Fourier transform. Next, a filtering process for equalization is performed. Then, the filtered data is transformed back to time domain signal data by inverse fast Fourier transform (hereinafter called as "IFFT" hereinafter). By the above process, the waveform distortion of the original time domain signal is compensated. Hereinafter, when FFT and IFFT are not distinguished, they will be denoted by "FFT/IFFT."

In general, a "butterfly operation" is used in the FFT/IFFT processing. For example, Patent Literature (PTL) 1 discloses an FFT apparatus and the like using a butterfly operation. PTL 1 also describes "twiddle factor multiplication" (described later), i.e., multiplication using a twiddle coefficient or twiddle factor. Further, the Cooley-Tukey butterfly operation as an efficient FFT/IFFT processing method is described in Non-Patent Literature (NPL) 1, for example.

However, the Cooley-Tukey FFT/IFFT with a large number of points requires a complex circuit. Hence, the FFT/IFFT processing is decomposed into two smaller FFTs/IFFTs by using a Prime Factor method described in NPL, for example.

FIG. 26 illustrates data flow 500 of a 64-point FFT decomposed into a two-stage radix-8 butterfly process by using the Prime Factor method. The data flow 500 includes a data reordering processing part 501, radix-8 butterfly operations are performed a total of sixteen times by butterfly operation processing parts 502 and 503, and a twiddle factor multiplication processing part 504 that multiplies a twiddle factor $\{W^k\}(W=\exp(-2\pi j/N), j^2=-1)$ (the twiddle factors are $(W^0, W^1, \ldots, W^7), \ldots, (W^0, W^7, \ldots, W^{49})$ in FIG. 26).

In the data flow 500 illustrated in FIG. 26, input time-domain data x(n) (n=0, 1, ..., 63) is Fourier-transformed into frequency-domain signals X(k) (k=0, 1, ..., 63) by the FFT processing. Note that in FIG. 26, a part of the data flow is omitted. Even when performing IFFT processing, a basic structure of the data flow is the same as the data flow 500 illustrated in FIG. 26.

If the entirety of the data flow 500 illustrated in FIG. 26 is to be implemented by a circuit, the circuit will become a huge scale. Therefore, the entirety of the FFT processing is generally implemented by repeatedly utilizing a circuit that implement a partial processing of the data flow according to a required processing performance.

For example, in the data flow in FIG. 26, if an FFT apparatus that performs the FFT processing on eight pieces of data in parallel (hereinafter referred to as "in 8-data parallel" for short) is made as a physical circuit, the 64-point FFT processing can be implemented by repeating the processing eight times in total.

Processing repeated eight times is performed sequentially, each corresponding to each of partial data flows 505a to 505h performed on eight pieces of data. More specifically, the processing is performed as follows:

at the first time, the processing corresponding to the partial data flow 505a is performed, at the second time, the processing corresponding to the partial data flow 505b is performed, at the third time, the processing corresponding to the partial data flow 505c (not shown in the drawing) is performed.

Similarly, each of the processing up to the eighth partial data flow 505h is sequentially performed thereafter. The 64-point FFT processing is realized by the processing described above.

In a butterfly operation, a plurality of items of data arranged in a sequential order are read in an order according to a predetermined rule and processed. Therefore, in a butterfly operation, reordering of a plurality of items of data is needed, for which a RAM (Random Access Memory) is mainly used. For example, PTL 2 describes an FFT apparatus that performs reordering of a plurality of items of data using a RAM(s) in a butterfly operation. Further, for example, PTL 3 describes a speed-up technology utilizing parallel processing of butterfly operations in an FFT operation apparatus with reduced memory usage.

PTL1: Japanese Unexamined Patent Application Publication No. JP-H08-137832A (pp. 3-5, FIG. 25)

PTL2: Japanese Unexamined Patent Application Publication No. JP2001-56806A (Page 5, FIG. 1)

PTL3: Japanese Unexamined Patent Application Publication No. JP2012-22500A (Page 5, FIG. 1)

NPL1: J. W. Cooley, J. W. Tukey, "An Algorithm for the Machine Calculation of Complex Fourier Series," Mathematics of Computation, US, American Mathematical Society, April 1965, Vol. 19, No. 90, pp. 297-301

NPL2: D. P. Kolba. "A Prime Factor FFT Algorithm Using High-Speed Convolution," IEEE Trans. On Acoustics, US, IEEE Signal Processing Society. August 1977, Vol. 29, No. 4, pp. 281-294

SUMMARY

Two's complement representation is widely used as a method for representing signal data with binary numbers in digital signal processing. In the two's complement representation, an addition/subtraction processing circuit can be realized with a small circuit scale because subtraction can be represented by addition.

On the other hand, values per bit greatly differ between a small positive value and a small negative value in the vicinity of a value zero in the two's complement representation. As a result, if a signal whose value frequently changes between positive and negative in the vicinity of zero is represented by a two's complement, a bit-wise operation rate (toggle rate) will be large. Dynamic power consumption (dynamic power) P of a digital signal processing circuit realized by a CMOS (Complementary Metal Oxide Semiconductor) circuit can be expressed by the following Equation (1).

$$P=(1/2)*a*C*V^2*f \quad (1)$$

where
a: circuit operation rate (percentage-activity),
C: load capacity,
V: voltage, and
f: operating frequency.

The circuit operation rate (percentage-activity) is given by a ratio of an estimated value of the number of switching times to the number of clock cycles during a certain period of time.

Since a bit-wise operation rate (toggle rate) of signal data determines the percentage-activity a, reducing the bit-wise operation rate is effective in reducing power consumption. Signal data in signal processing for communication often changes between positive and negative in the vicinity of a value zero. As one of important processing in digital signal processing, the fast Fourier transform (FFT) processing handles internal data that often takes a small value near the value zero.

When the two's complement representation is used in the processing, the bit-wise operation rate may become large, resulting in an increased power consumption.

In contrast to the two's complement representation, there is known a sign magnitude representation as a method for representing digital data having a small bit-wise operation rate in a vicinity of the value zero. FIG. 27 illustrates the binary representations of +7 to −8 signal values in 8-bit signal data as an example of the two's complement representation and the sign magnitude representation. In the two's complement representation, bit values of higher-order bits greatly differ between positive and negative values with the value zero as a boundary. As a result, if a signal that frequently changes between positive and negative in the vicinity of the value zero is represented, the bit-wise operation rate will be large. For example, when a signal value changes from +1 to −1, all the seven bits other than the least significant bit (LSB) change.

On the other hand, in the sign magnitude representation, since the most significant bit (MSB) expresses a sign and other bits a magnitude of the value, with the value zero as a boundary, the difference in bit values between positive and negative values is small. Hence, the bit-wise operation rate is small when a signal that frequently changes between positive and negative in the vicinity of the value zero is represented in the sign magnitude representation. For example, when the signal value changes from +1 to −1, only one bit, the most significant bit, changes.

The sign magnitude representation, however, cannot represent subtraction using addition. Therefore, an addition processing circuit and a subtraction processing circuit must be separately provided, which results in an increase of the scale of a circuit that implements addition/subtraction processing. Since the circuit scale determines a load capacity C in the dynamic power consumption P shown in the Equation (1), an increase in the circuit scale increases a power consumption.

That is, compared with the two's complement representation, the sign magnitude representation can reduce the percentage-activity a, but increases the load capacity C of an addition/subtraction circuit. This causes a problem that a power consumption becomes large, when signal processing involves a significant amount of addition/subtraction processing in particular.

It is conceivable to use the two's complement representation which enables efficient circuit implementation for addition/subtraction processing and use the sign magnitude representation which enables reduction of an operation rate for processing other than addition/subtraction.

However, conversion between the two's complement representation and the sign magnitude representation requires bit inversion and one-addition processing (increment processing). This results in a problem that in a case of a circuit requiring a lot of conversion processing, a power consumption increases by that of the conversion circuit.

FIG. 28 illustrates a configuration example of a conversion circuit 600 that performs conversion between the two's complement representation and the sign magnitude representation. The conversion circuit 600 is configured by connecting a bit inversion circuit 601 and a one-addition circuit 602. In the conversion circuit 600, the one-addition circuit 602 in particular has a non-negligible circuit scale, compared with other logic processing circuits and operation processing circuits. Therefore, there is a problem that in a case where a lot of the conversion processing is required, the scale of the circuit and power consumption increase by those of the conversion circuits.

The present invention is therefore invented to solve the problems described above, and it is an object thereof to provide a signal processing apparatus, method, and program, each enabling suppression of increase or reduction of entire circuit scale and power consumption.

According to an aspect of the present invention, there is provided a signal processing apparatus including, a storage processing part that performs storage processing on data represented in a second representation format, and an operation processing part that performs operation processing on at least one of data represented in a two's complement representation or data obtained by applying compensation processing to data represented in the second representation format. The second representation format is identical to a representation format of two's complement when a value of the data is positive or zero, while, when the value of the data is negative, the second representation format is a representation format in which all bits other than a most significant bit indicating a sign in a two's complement representation of the data are inverted.

According to an aspect of the present invention, there is provided a fast Fourier transform (FFT) apparatus including a butterfly operation processing part that performs butterfly operation processing, a twiddle factor multiplication processing part that performs twiddle factor multiplication processing, and a data reordering processing part that rearranges an order of a plurality of data, and performs a fast Fourier transform or an inverse fast Fourier transform by performing operation processing using both a two's complement representation and a second representation format that is different from the two's complement representation as data representation formats. The second representation format is identical to a representation format of two's complement when a value of the data is positive or zero, while, when the value of the data is negative, the second representation format is a representation format in which all bits other than a most significant bit indicating a sign in a two's complement representation of the data are inverted.

The data reordering processing part performs storage processing on data represented in the second representation format. The twiddle factor multiplication processing part performs processing on data obtained by applying compensation processing to data represented in the second representation format, for multiplication processing, and performs processing on data represented in a two's complement representation, for addition processing.

The compensation processing adds a value one to M bits from a least significant bit (where M is a positive integer and not more than N) in data of N bits (where N is a predetermined positive integer) when the data of N bits (N being a positive integer) represented in the second representation format has a negative value.

According to an aspect of the present invention, there is provided a signal processing method including steps of:

performing storage processing on data represented in a second representation format that is different from a two's complement representation; and performing operation processing on at least one of data represented in a two's complement representation or data obtained by applying compensation processing to data represented in the second representation format. The second representation format is identical to a representation format of two's complement when a value of the data is positive or zero, while, when the value of the data is negative, the second representation format is a representation format in which all bits other than a most significant bit indicating a sign in a two's complement representation of the data are inverted.

According to an aspect of the present invention, there is provided a program causing a computer to execute:

a storage processing on data represented in a second representation format; and an operation processing on at least any one of data represented in a two's complement representation or data obtained by applying compensation processing to data represented in the second representation format. The second representation format is identical to a representation format of two's complement when a value of the data is positive or zero, while, when the value of the data is negative, the second representation format is a representation format in which all bits other than a most significant bit indicating a sign in a two's complement representation of the data are inverted. According to the present invention, there is provided a non-transitory computer-readable medium storing the program, such as a semiconductor memory, HDD (Hard Disk Drive), CD (Compact Disk), DVD (Digital Versatile Disk) or the like.

According to the present invention, it is possible to realize suppression of increase or reduction in circuit scale and power consumption of the entire circuit.

BRIEF DESCRIPTION OF THE DRAWINGS

FIG. 2 is a diagram illustrating an example of a data representation format in a table format according to the first example embodiment of the present invention.

FIG. 15 is a diagram schematically illustrating an arrangement of data sets according to a sequential order in FFT processing according to the second example embodiment of the present invention.

FIG. 16 is a diagram schematically illustrating an arrangement of data sets according to a bit reverse order in FFT processing according to the second example embodiment of the present invention.

FIG. 20 is a diagram schematically illustrating an arrangement of data sets according to a sequential order according to the second example embodiment of the present invention.

FIG. 21 is a diagram schematically illustrating an arrangement of data sets according to an intermediate order according to the second example embodiment of the present invention.

FIG. 22 is a time chart for explaining the operation of a data reordering part according to the second example embodiment of the present invention.

FIG. 24 is a time chart for explaining an operation of an intra-data set rearrangement part according to the second example embodiment of the present invention.

FIG. 27 is a diagram illustrating an example of data representation formats in a table format.

DETAILED DESCRIPTION

First Example Embodiment

Figure 1:
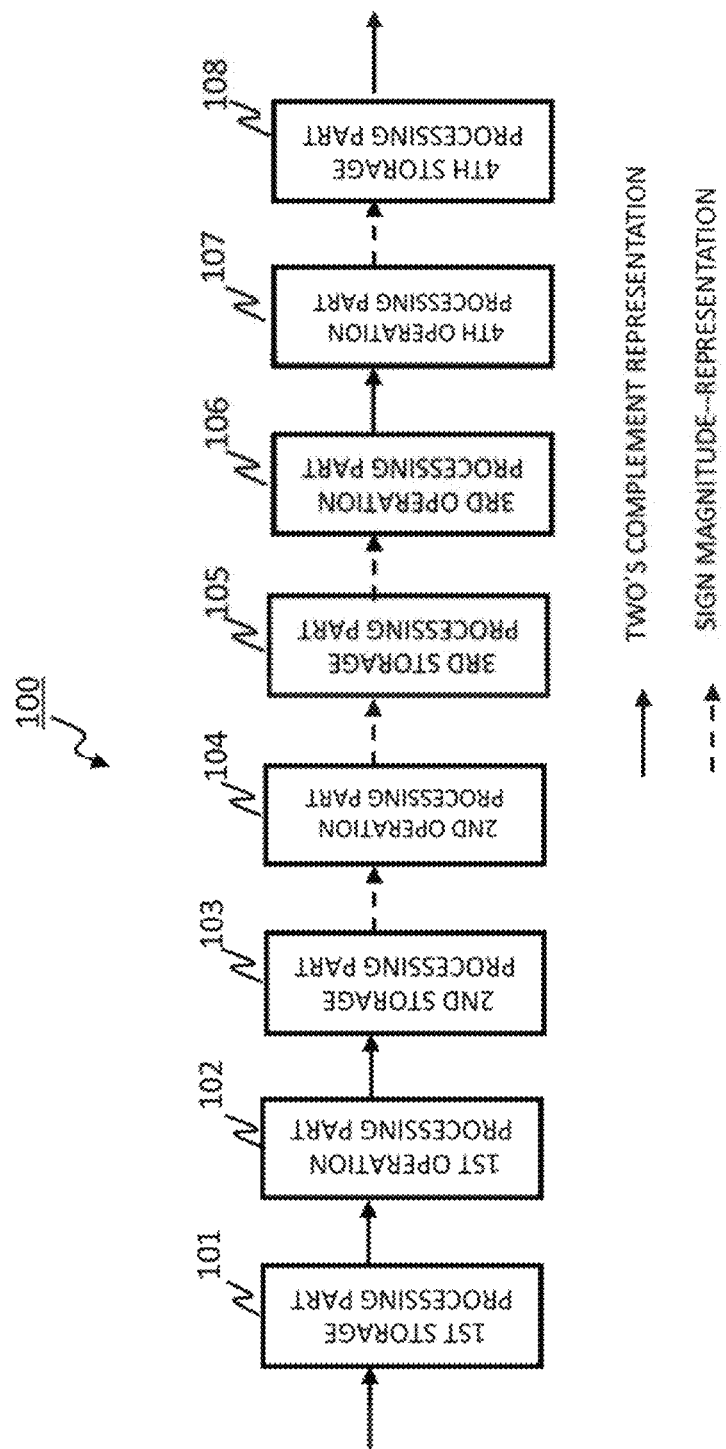
FIG. 1 is a diagram illustrating an example of a configuration of a signal processing apparatus according to a first example embodiment of the present invention.

FIG. 1 illustrates an example of a configuration of a signal processing apparatus (a signal processing circuit) 100 according to a first example embodiment of the present invention. The signal processing apparatus 100 includes a first storage processing part 101, a second storage processing parts 103, a third storage processing part 105 and a fourth storage processing part 108 as storage processing parts that perform storage processing such as buffering processing of signal data and re-timing processing and reordering processing or the like. The a signal processing apparatus 100 also includes a first operation processing part 102, a second operation processing part 104, a third operation processing part 106, and a fourth operation processing part 107 as operation processing parts that perform operation processing such as addition/subtraction and multiplication/division, and so forth. It is noted that there may be a configuration in which a plurality of storage processing parts are provided in one unit. There may be a configuration in which a plurality of operation processing parts are provided in one unit.

The first storage processing part 101 receives signal data represented in a two's complement representation from outside of the signal processing apparatus 100, performs storage processing, and outputs the signal data represented in the two's complement representation to the first operation processing part 102.

The first operation processing part 102 receives the signal data represented in the two's complement representation from the first storage processing part 101, performs operation processing, and outputs signal data represented in the two's complement representation to the second storage processing part 103.

The second storage processing part 103 receives the signal data represented in the two's complement representation from the first operation processing part 102, performs storage processing, and outputs signal data represented in a sign magnitude—representation to the second operation processing part 104.

The second operation processing part 104 receives the signal data represented in the sign magnitude—representation from the second storage processing part 103, performs operation processing, and outputs signal data represented in the sign magnitude—representation to the third storage processing part 105.

The third storage processing part 105 receives the signal data represented in the sign magnitude—representation from the second operation processing part 104, performs storage processing, and outputs the signal data represented in the sign magnitude—representation to the third storage processing part 106.

The third operation processing part 106 receives the signal data represented in the sign magnitude—representation from the third storage processing part 105, performs operation processing, and outputs signal data represented in the two's complement representation to the fourth storage processing part 107.

The fourth operation processing part 107 receives the signal data represented in the two's complement representation from the third storage processing part 106, performs operation processing, and outputs signal data represented in the sign magnitude—representation to the fourth storage processing part 108.

The fourth storage processing part 108 receives the signal data represented in the sign magnitude—representation from the fourth operation processing part 107, performs storage processing, and outputs the signal data represented in the two's complement representation to outside of the signal processing apparatus 100.

Note that the "sign magnitude—representation" of the present invention is identical to the two's complement representation of data in a case that a value of the data is positive or zero data (non-negative), while all bits other than a most significant bit indicating a sign of the two's complement representation of the data are inverted in a case that the value of the data is negative.

FIG. 2 shows the binary representations of +15 to −16 signal values in 5-bit signal data in the sign magnitude—representation, and those in the two's complement and the sign magnitude representations as a comparison.

In FIG. 2, when a data value is positive, the sign magnitude—representation, the two's complement representation, and the sign magnitude representation have the same bit representation. When the data value is zero, the sign magnitude—representation and the two's complement representation have the same bit representation. When a data value is negative, in the sign magnitude—representation, all bits other than a most significant bit indicating a sign of the two's complement representation are inverted. Similarly, when a data value is negative, in the two's complement representation, all bits other than a most significant bit indicating a sign of the sign magnitude—representation are inverted. "A sign magnitude—representation" corresponds to a second representation format in the claims of the present application.

As illustrated in FIG. 2, with the value zero as a boundary, a difference in bit values between positive and negative values is small in the sign magnitude—representation, as with the sign magnitude representation. Hence, the sign magnitude—representation has a characteristic that the bit-wise operation rate is small, when representing a signal whose value frequently changes between positive and negative in a vicinity of the value zero. For example, when a signal value changes from +1 ("00001") to −2 ("10001"), only one bit, the most significant bit, transitions in the sign magnitude—representation.

Figure 3:
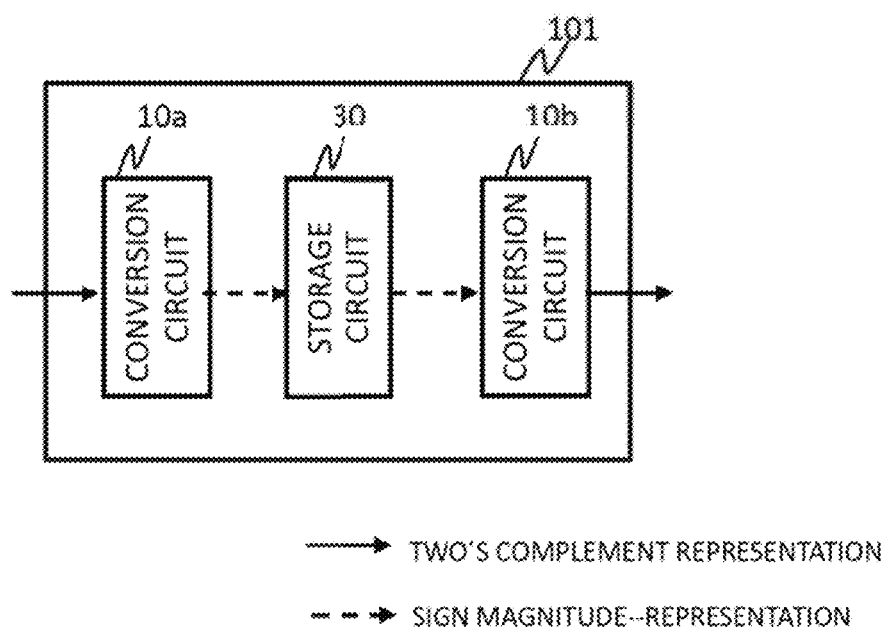
FIG. 3 is a diagram illustrating an example of a configuration of a storage processing part according to the first example embodiment of the present invention.

FIG. 3 illustrates an example of a configuration of a first storage processing part 101. Referring to FIG. 3, the first storage processing part 101 includes a conversion circuit 10a, a storage circuit 30, and a conversion circuit 10b. The conversion circuit 10a is a circuit that converts received signal data represented in a two's complement representation into signal data represented in a sign magnitude—representation for output.

The storage circuit 30 is a circuit that receives signal data represented in the sign magnitude—representation outputted by the conversion circuit 10a, performs storage processing while remaining in the sign magnitude—representation, and outputs a result to the conversion circuit 10b also while remaining in the sign magnitude—representation.

The conversion circuit 10b is a circuit that converts the signal data represented in the sign magnitude—representation outputted by the storage circuit 30 into signal data represented in the two's complement representation for output.

Figure 4:
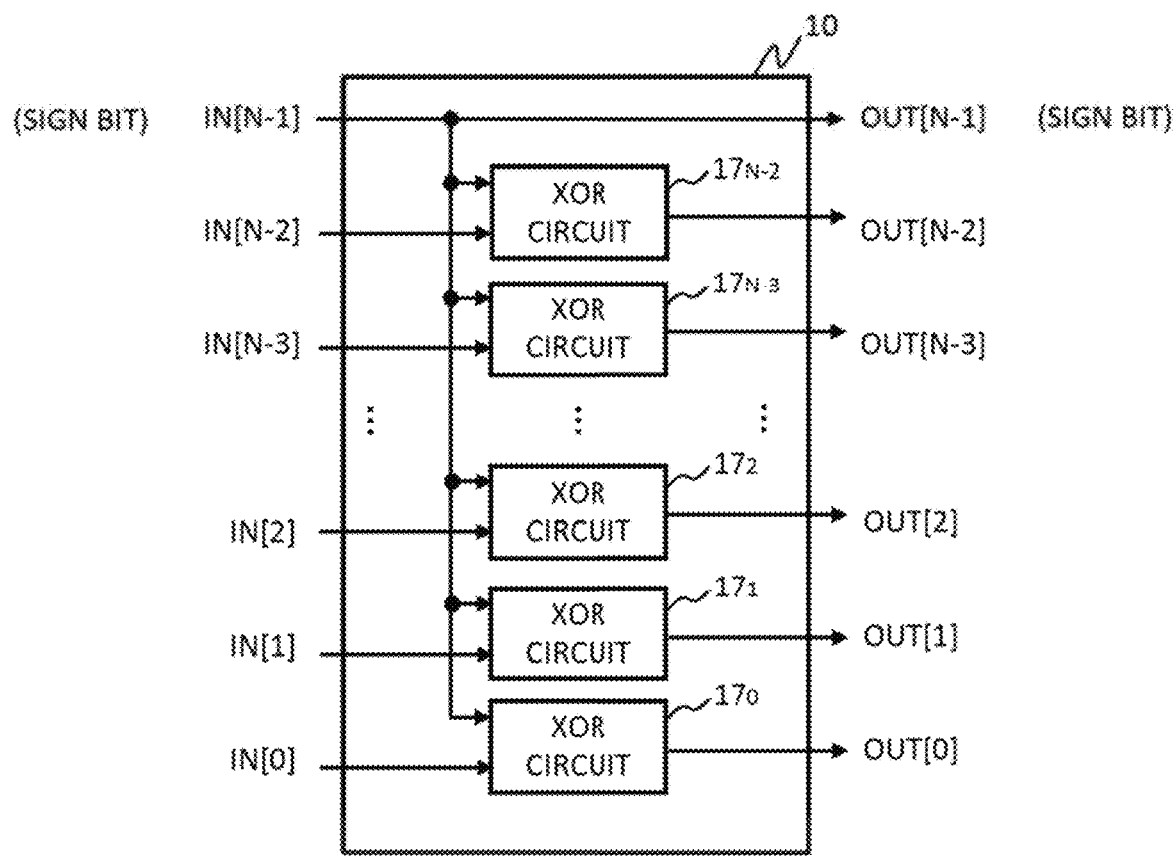
FIG. 4 is a diagram illustrating an example of a configuration of a conversion circuit according to the first example embodiment of the present invention.

The conversion circuits 10a and 10b can be realized by a conversion circuit 10 illustrated in FIG. 4, for example. The conversion circuit 10 is a circuit that receives N-bit (N is a positive integer) signal data, converts from the two's complement representation into the sign magnitude—representation or from the sign magnitude—representation to the two's complement representation, and outputs the result.

Referring to FIG. 4, the conversion circuit 10 outputs a most significant bit indicating a sign and received from the input IN [N−1] to OUT [N−1] as a sign bit, as it is. The inputs IN [0] to IN [N−2] are respectively received by first terminals of XOR (exclusive OR) circuits $17_0$ to $17_{N-2}$. The most significant bit indicating a sign and received from the input IN [N−1] is received by second terminals of XOR circuits $17_0$ to $17_{N-2}$. The XOR circuits $17_0$ to $17_{N-2}$ respectively output, to outputs OUT [0] to OUT [N−2], operation results of exclusive OR's of inputs of the first terminals and the second terminals.

When an input data value is positive or zero, a value of the most significant bit indicating a sign, which is received from the input IN [N−1], is zero, and the data values supplied to the inputs IN [0] to IN[N−2] are outputted, as they are, to the outputs OUT [0] to OUT [N−2], respectively.

On the other hand, when an input data value is negative, a value of the most significant bit indicating a sign which is received from the input IN [N−1], is one, and data obtained by inverting the data values supplied to the inputs IN [0] to IN [N−2] are outputted to the outputs OUT [0] to OUT [N−2], respectively, by exclusive OR processing of the inputs of the first terminal and the second terminal at the XOR circuits $17_0$ to $17_{N-2}$.

In the processing described above, the conversion circuit 10 converts signal data represented in the two's complement representation received at the inputs IN [0] to IN [N−1] (IN [N−1] is a sign bit) into the sign magnitude—representation and outputs signal data in the sign magnitude—representation from the outputs OUT [0] to OUT [N−1](OUT [N−1] is a sign bit). The signal data represented in the sign magnitude—representation received at the inputs IN [0] to IN [N−1](IN [N−1] is a sign bit) are converted into the two's complement representation and outputs signal data in the two's complement representation from the outputs OUT [0] to OUT [N−1] (OUT [N−1] is a sign bit).

As described above, in the conversion circuit 10, the conversion between the two's complement representation and the sign magnitude—representation can be achieved only with bit inversion processing. That is, in the conversion circuit 10, one-addition processing (increment processing), which the sign magnitude representation requires, is not required. Bit inversion processing can be implemented with exclusive OR. Therefore, the conversion circuit 10 can be achieved with an overwhelmingly small circuit scale, compared with other logic processing circuits and operation processing circuits.

Figure 5:
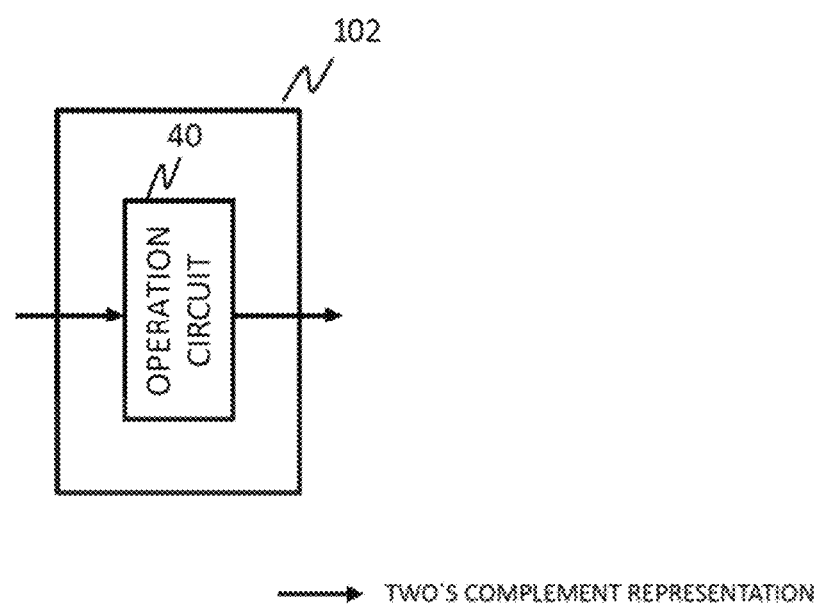
FIG. 5 is a diagram illustrating an example of a configuration of an operation processing part according to the first example embodiment of the present invention.

FIG. 5 illustrates an example of a configuration of a first operation processing part 102. The first operation processing part 102 includes an operation circuit 40. The operation circuit 40 performs operation processing on input signal data represented in the two's complement representation and outputs the result as signal data represented in the two's complement representation.

Operation processing performed by the operation circuit 40 includes addition processing and subtraction processing for which it is concretely difficult to efficiently achieve a circuit when the sign magnitude representation or the sign magnitude—representation is used.

Figure 6:
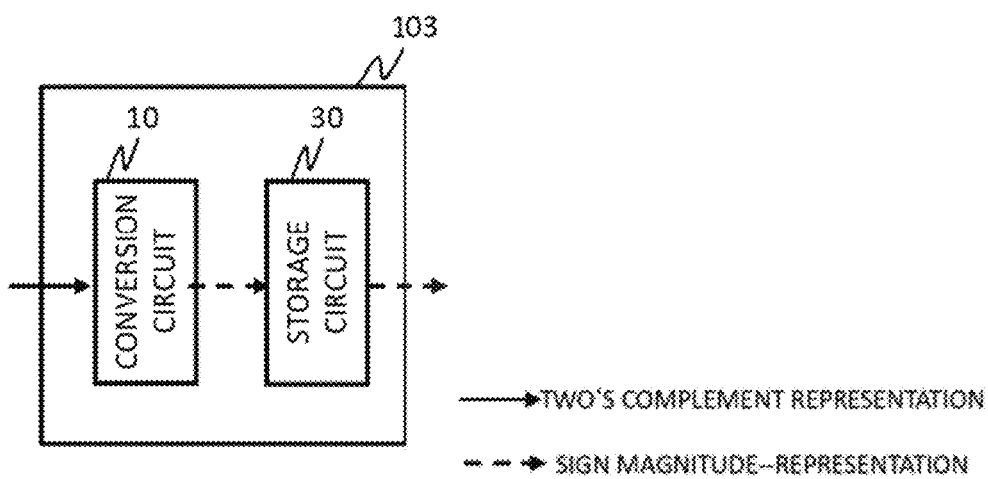
FIG. 6 is a diagram illustrating an example of a configuration of a storage processing part according to the first example embodiment of the present invention.

FIG. 6 illustrates an example of a configuration of a second storage processing part 103 shown in FIG. 1. The second storage processing part 103 includes a conversion circuit 10 and a storage circuit 30.

The conversion circuit 10 converts input signal data represented in the two's complement representation into signal data represented in the sign magnitude—representation and outputs the result.

The storage circuit 30 receives signal data represented in the sign magnitude—representation and outputted by the conversion circuit 10, performs storage processing while staying in the sign magnitude—representation for output also while remaining in the sign magnitude—representation.

Figure 7:
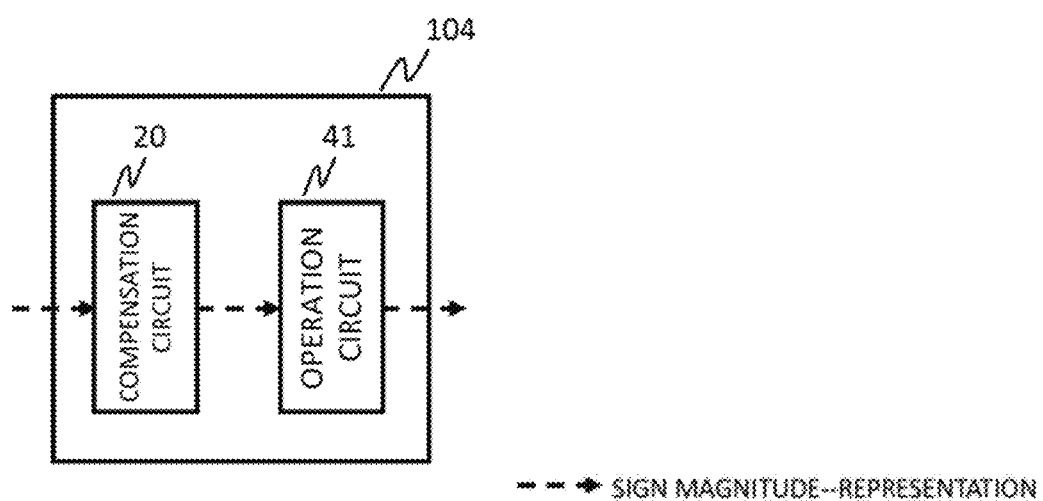
FIG. 7 is a diagram illustrating an example of a configuration of an operation processing part according to the first example embodiment of the present invention.

FIG. 7 illustrates an example of a configuration of a second operation processing part 104, The second operation processing part 104 includes a compensation circuit 20 and an operation circuit 41. The compensation circuit 20 is a circuit that performs compensation processing on input signal data represented in the sign magnitude—representation and outputs the result.

The operation circuit 41 performs operation processing on signal data represented in the sign magnitude—representation and having compensation processing applied thereto by the compensation circuit 20 and output a result as signal data represented in the sign magnitude—representation. The operation performed by the operation circuit 41 includes, more specifically, multiplication processing and division processing for which it is possible to efficiently implement a circuit for both the sign magnitude representation and the sign magnitude—representation.

Figure 8:
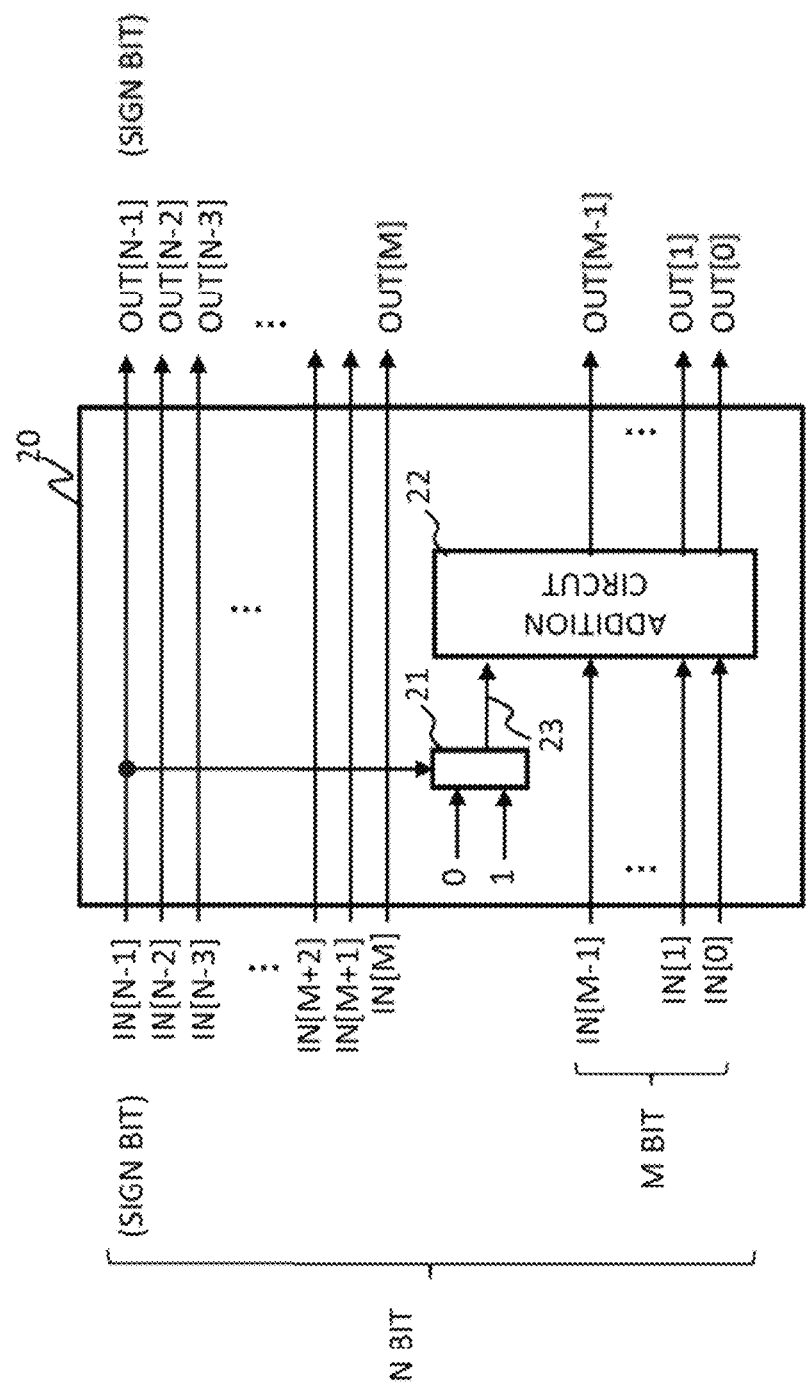
FIG. 8 is a diagram illustrating an example of a configuration of a compensation circuit according to the first example embodiment of the present invention.

FIG. 8 illustrates an example of a configuration of a compensation circuit 20 shown in FIG. 7. The compensation circuit 20, when input signal data IN of N bits (N is a positive integer) is negative, performs processing of adding a value one to M bits (IN [0] to IN[M−1]) from a least significant bit (where M is a positive integer and not more than N) of the input IN, and outputs the result to M bits (OUT[0] to OUT[M−1]) from a least significant bit of the output OUT. For other bits (IN[M] to IN [N−1]), the compensation circuit 20 outputs the input IN as they are to corresponding bits of the outputs OUT (OUT [M] to OUT [N−1]).

On the other hand, when the input IN is positive, the compensation circuit 20 outputs a value of signal data IN as it is to signal data OUT.

Referring to FIG. 8, the compensation circuit 20 includes a selector circuit 21 and an addition circuit 22. The selector circuit 21, with reference to a most significant bit received from the input IN [N−1] indicating a sign, outputs a value zero to the addition circuit 22 when the input IN is positive (IN[N−1] is a value zero), and outputs a value one to the addition circuit 22 when the input IN is negative (IN[N−1] is a value one).

The addition circuit 22 is a circuit that adds a value outputted from the selector circuit 21 and M bits from the least significant bit of the input IN (IN[0] to IN[M−1]), and outputs the M bits from the least significant bit of the output OUT (OUT [0] to OUT [M−1]).

Figure 9:
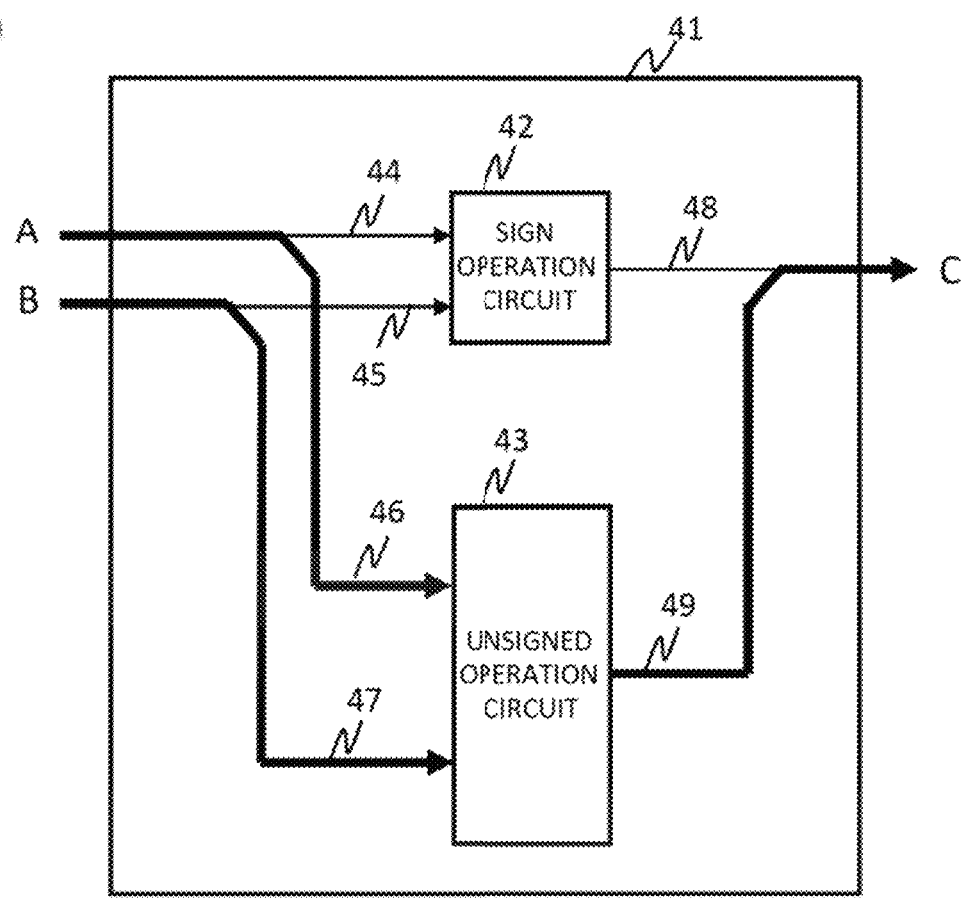
FIG. 9 is a diagram illustrating a configuration of an operation circuit according to the first example embodiment of the present invention.

The operation circuit 41 of FIG. 7 can be implemented by, for example, an operation circuit related to a sign magnitude representation. FIG. 9 illustrates an example of a configuration of the operation circuit 41 shown in FIG. 7. The operation circuit 41 includes a sign operation circuit 42 and an unsigned operation circuit 43.

The sign operation circuit 42 is a circuit that performs operation of a sign bit of a most significant bit in a sign magnitude representation, and receives a sign bit 44 that is a most significant bit of the input A and a sign bit 45 that is a most significant bit of the input B.

The sign operation circuit 42 performs operation and outputs a sign bit of an output C by outputting a value zero to a sign bit 48 when both the sign bit 44 and the sign bit 45 have a value zero;

outputting a value one to the sign bit 48 when any one of the sign bit 44 and the sign bit 45 has a value one: and outputting a value zero to the sign bit 48 when both the sign bit 44 and the sign bit 45 have a value one.

The unsigned operation circuit 43 is a circuit that performs operation on a magnitude part which is other than the sign bit in the sign magnitude representation.

The unsigned operation circuit 43 receives bits 46 other than the most significant bit of the input A and bits 47 other than the most significant bit of the input B, performs operation processing on the bits 46 and 47 and outputs a result to a magnitude 49, thereby operating and outputting a magnitude part other than a sign bit of the output C.

As described above, the operation circuit 41 is an operation circuit related to the sign magnitude representation, and can realize an operation that can be processed by separately operating a sign and a magnitude value other than the sign. More specifically, the operation circuit 41 can realize multiplication processing and division processing.

Next, a function (s) of a compensation circuit 20 will be described. As shown in FIG. 2, when the sign magnitude representation and the sign magnitude—representation are compared, in the case of a positive value, the same binary number representation represents the same value. On the other hand, in the case of a negative value, for the same binary number representation, the sign magnitude—representation represents a value smaller by one than the sign magnitude representation.

Therefore, when a signal data represented in the sign magnitude—representation is operated by an operation circuit related to a sign magnitude representation like the operation circuit 41, in a case where input data to be operated is a negative value, an error occurs in an operation result. The compensation circuit 20 provides a function of reducing an error of an operation result by compensating input data to be operated. The compensation circuit 20 adds one to the M bits from the least significant bit of received N bits when the input has a negative value.

Therefore, the input value (negative value) to the operation circuit 41 approaches a value represented in the sign magnitude representation from the value represented in the sign magnitude—representation. As a result, an error in an operation result can be reduced.

In a case where one is added to all the input N bits when the input is a negative value (when M=N), the value received by the operation circuit 41 becomes identical to a value represented in the sign magnitude representation and no error occurs in an operation result, but, since the addition processing is performed on all the input N bits, a circuit scale of the addition circuit 22 increases. That is, there is a characteristic that when M is increased, an operation error is reduced, but the circuit scale is increased, and when M is decreased, the operation error is increased but the circuit scale is reduced.

Therefore, the circuit scale of the compensation circuit 20 can be reduced by setting NM to a value as small as possible within a range in which the operation error can be allowed.

Figure 10:
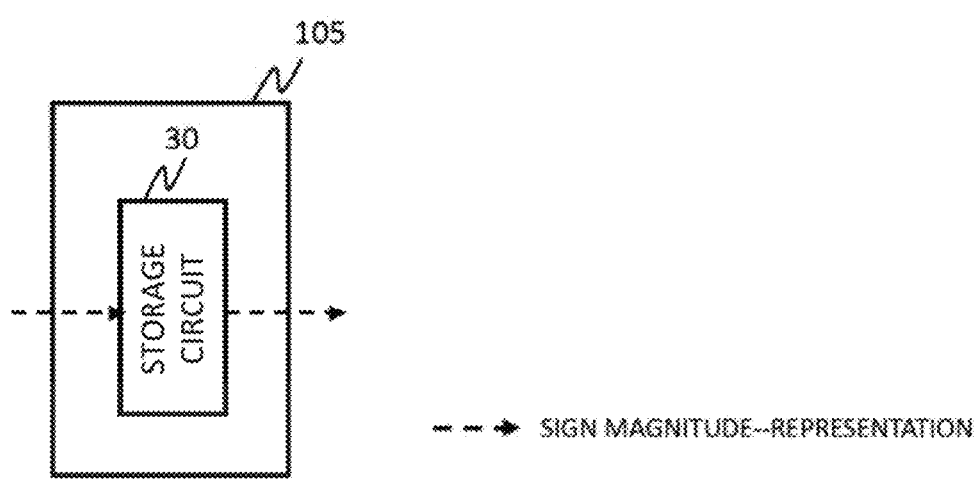
FIG. 10 is a diagram illustrating an example of a configuration of a storage processing part according to the first example embodiment of the present invention.

FIG. 10 illustrates an example of a configuration of a third storage processing part 105 part The third storage processing part 105 is a circuit that includes a storage circuit 30, receives the signal data represented in a sign magnitude—representation, performs storage processing, and outputs the result in the sign magnitude—representation as it is.

Figure 11:
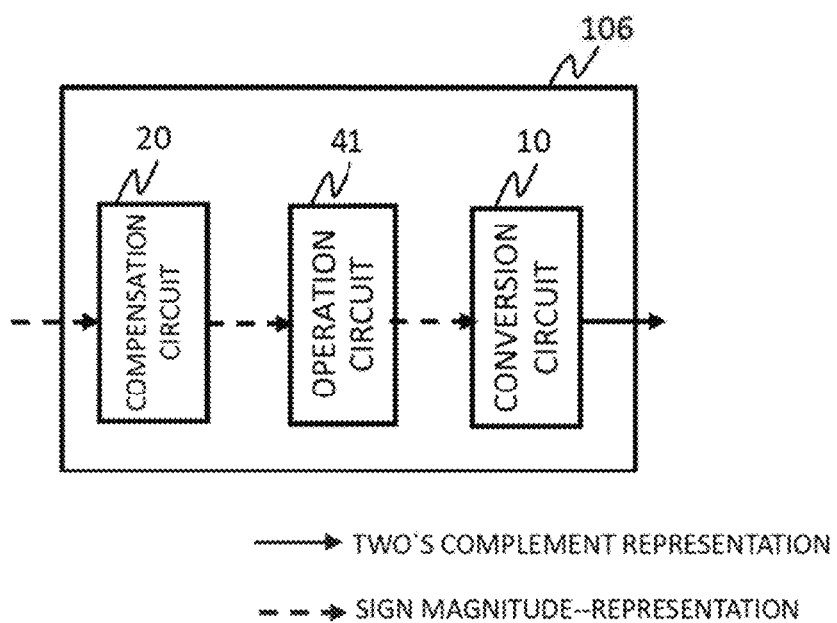
FIG. 11 is a diagram illustrating an example of a configuration of an operation processing part according to the first example embodiment of the present invention.

FIG. 11 illustrates an example of a configuration of a third operation processing part 106. The third operation processing part 106 can be configured by a compensation circuit 20, an operation circuit 41, and a conversion circuit 10.

The compensation circuit 20 performs compensation processing on the input signal data represented in a sign magnitude—representation by and outputs the result.

The operation circuit 41 performs operation processing on the signal data represented in the sign magnitude—representation obtained by performing compensation processing by the compensation circuit 20 and outputs the result as the signal data represented in the sign magnitude—representation.

The conversion circuit 10 converts the signal data represented in the sign magnitude—representation outputted by the operation circuit 41 into signal data represented in the two's complement representation and outputs the result.

Figure 12:
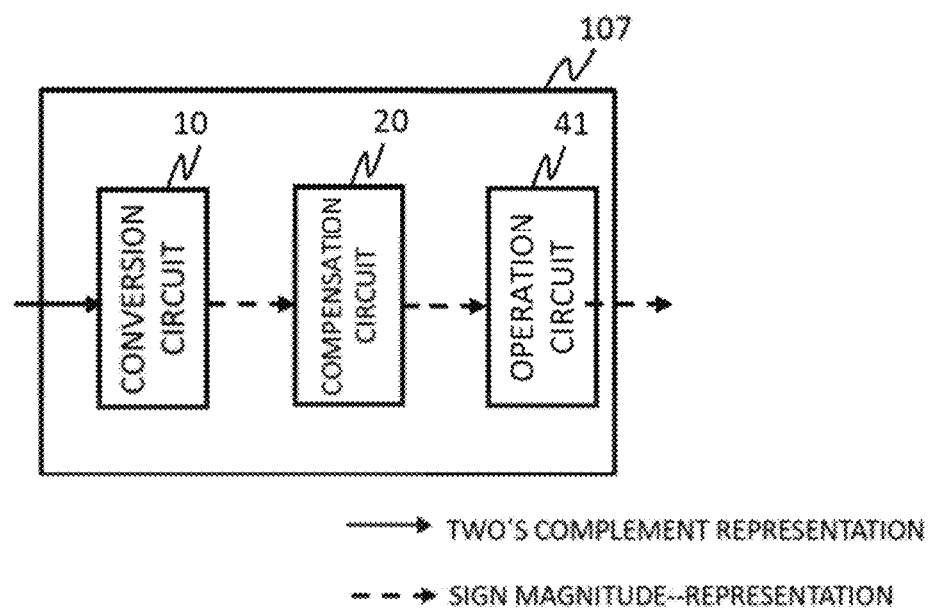
FIG. 12 is a diagram illustrating an example of a configuration of an operation processing part according to the first example embodiment of the present invention.

FIG. 12 illustrates an example of a configuration of a fourth operation processing part 107. The fourth operation processing part 107 can be configured by a con version circuit 10, a compensation circuit 20, and an operation circuit 41.

The conversion circuit 10 converts the input signal data represented in the two's complement representation into signal data represented in the sign magnitude—representation and outputs the result.

The compensation circuit 20 performs compensation processing on the input signal data represented in the sign magnitude—representation, and the result is outputted to the arithmetic circuit 41 which performs operation processing on the signal data obtained by preforming compensation processing by the compensation circuit 20 represented in the sign magnitude—representation and outputs the result as signal data represented in the sign magnitude—representation.

Figure 13:
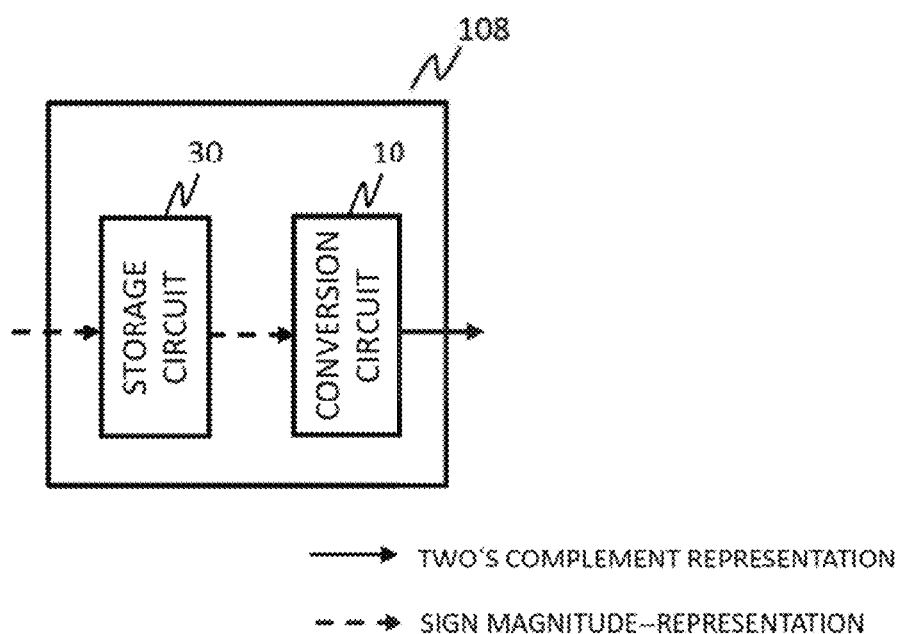
FIG. 13 is a diagram illustrating an example of a configuration of a storage processing part according to the first example embodiment of the present invention.

FIG. 13 illustrates an example of a configuration of a fourth storage processing part 108. The fourth storage processing part 108 can be configured by a storage circuit 30 and a conversion circuit 10.

The storage circuit 30 receives input signal data represented in the sign magnitude—representation, performs storage processing while remaining in the sign magnitude—representation as it is, and outputs the result while remaining in the sign magnitude—representation as it is to the conversion circuit 10.

The conversion circuit 10 converts the signal data represented in the sign magnitude—representation outputted by the storage circuit 30 into signal data represented in the two's complement representation and outputs the result.

Figure 29A:
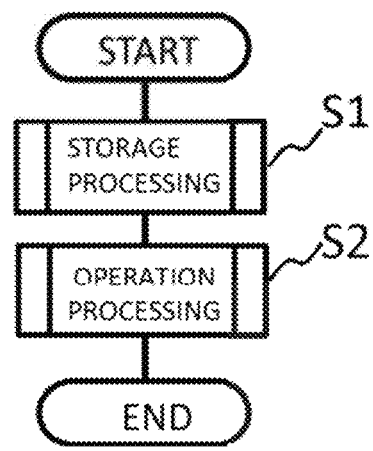
FIG. 29A to 29C are diagrams illustrating a mode of a method according to the first example embodiment of the present invention.

FIG. 29A illustrates a method according to the first example embodiment. The method of the first example embodiment at least includes storage processing of data converted into a sign magnitude—representation (step S1), and operation processing of performing on at least one of data represented in the two's complement representation or data obtained by performing compensation processing represented in the sign magnitude—representation (step S2). The storage processing (step S1) may be further included after the operation processing (step S2). Alternatively, the operation processing (step S2) may be executed first, and then the storage processing (step S1) may be executed. Each processing of steps S1 and S2 may be realized by causing a processor connected to the memory to execute a program (instruction group).

Figure 29B:
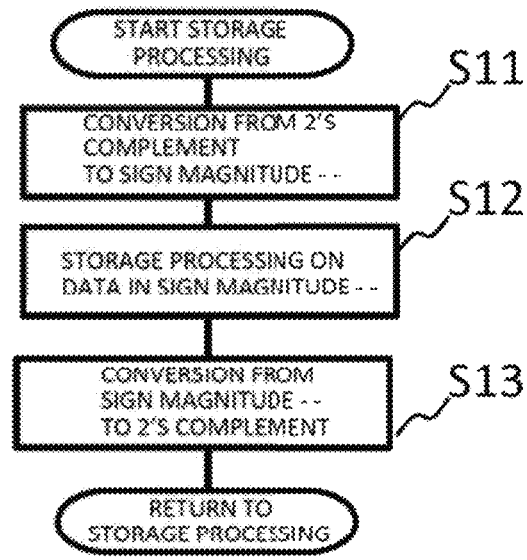

FIG. 29B illustrates an example of a procedure of storage processing (step S1) as shown in FIG. 29A. The storage processing includes first conversion processing (step S11) of converting data from a two's complement representation to a sign magnitude—representation, storage processing of storing the data converted to the sign magnitude—representation in a storage circuit (step S12), and second conversion processing (step S13) of reading out the data of the sign magnitude—representation after the storage processing from the storage circuit, converting it into a two's complement representation, and outputting the result. Note that, in FIG. 29B, depending on the combination with the operation processing (step S2), only step S12 may be included, or any one of step S11 and step S13 may be included in addition to step S12.

Figure 29C:
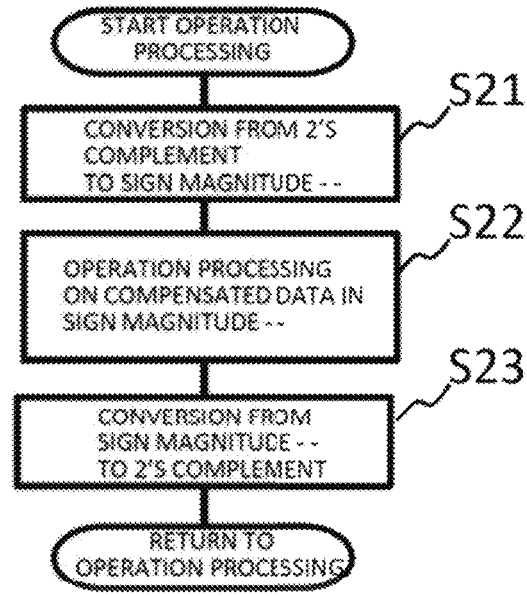

FIG. 29C illustrates an example of a procedure of operation processing (step S2) as shown in FIG. 29A. The operation processing includes first conversion processing (step S21) of converting data from a two's complement representation to a sign magnitude—representation, operation processing (step S22) of performing operation on data obtained by performing compensation processing on the data converted to the sign magnitude—representation, and second conversion processing (step S23) of converting the operation result in the sign magnitude—representation format into a two's complement representation, and outputting the result. When the data represented in the two's complement representation is outputted from the storage processing (step S1) and the operation processing is performed on the data represented in the two's complement representation in step S22, steps S21 and S23 of FIG. 29C are omitted. Also, when the storage processing (step S1) of FIG. 29A outputs the data represented in the sign magnitude—representation format and in step S22 of FIG. 29C, operation processing is performed on data obtained by performing compensation processing on the data represented in the sign magnitude—representation format, step S21 of FIG. 29C is omitted. That is, depending on the combination of the representation format of the data from the storage processing (step S1) and the representation format of the data in the operation processing (step S2), both of step S21 and step S23 of FIG. 29C, or either one may be included.

Effects of the First Example Embodiment

As described above, in the first example embodiment, the signal processing apparatus 100 performs storage processing with the sign magnitude—representation at the first storage processing part 101, the second storage processing part 103, the third storage processing part 105, and the fourth storage processing part 108. Furthermore, the signal processing apparatus 100 performs operation processing with the sign magnitude—representation at the second operation processing part 104 and the fourth operation processing part 107.

As shown in FIG. 2, a sign magnitude—representation has a small bit value difference between a positive value and a negative value with the value zero as a boundary, in the same way as a sign magnitude representation. Therefore, there is a characteristic that even when a signal that frequently changes between positive and negative in the vicinity of the value zero is represented, a bit-wise operation rate is small. As a result, it is possible to reduce the percentage-activity in the storage processing and the operation processing, as compared with the case where the two's complement representation is used for processing as it is.

Further, the conversion processing between a two's complement representation and a sign magnitude—representation by the conversion circuit 10 can be realized only by the bit inversion processing, and the one addition processing (increment processing) required for a sign magnitude representation is not required.

Since the inversion processing can be achieved only with an XOR circuit, this can be realized with an overwhelmingly small circuit scale, compared with other logic processing circuits and operation processing circuits.

Therefore, in the first example embodiment, even when a signal which frequently changes between positive and negative in the vicinity of a value zero is processed, the percentage-activity in the storage processing parts can be reduced. As a result, the power consumption in the storage processing part can be reduced.

Further, it is possible to reduce operation error that occurs even when operation processing such as multiplication processing and division processing is performed while remaining in the sign magnitude—representation owing to compensation of a value of a sign magnitude—representation by the compensation circuit 20. Therefore, it is possible to increase the number of operation circuits to which the sign magnitude—representation can be applied, so that the power consumption in the operation processing part can be reduced.

Further, since the number of bits (M) to be compensated in the compensation circuit 20 can be set to an optimum value according to the allowable operation error, the circuit scale of the compensation circuit 20 can be reduced. As a result, power consumption in the operation processing part can be reduced.

On the other hand, in the first example embodiment, in the first operation processing part 102 and the third operation processing part 106, the operation processing is performed as it is in the two's complement representation. Therefore, the percentage-activity related to these operation processing parts is not reduced, but the circuit scale does not increase significantly due to conversion between the data representation formats unlike the case of applying a sign magnitude representation. Therefore, the power consumption of the entire signal processing apparatus can be reduced by the amount that the power consumption of the second signal processing part 104, the fourth signal processing part 107, and the storage processing can be reduced.

Second Example Embodiment

Figure 14:
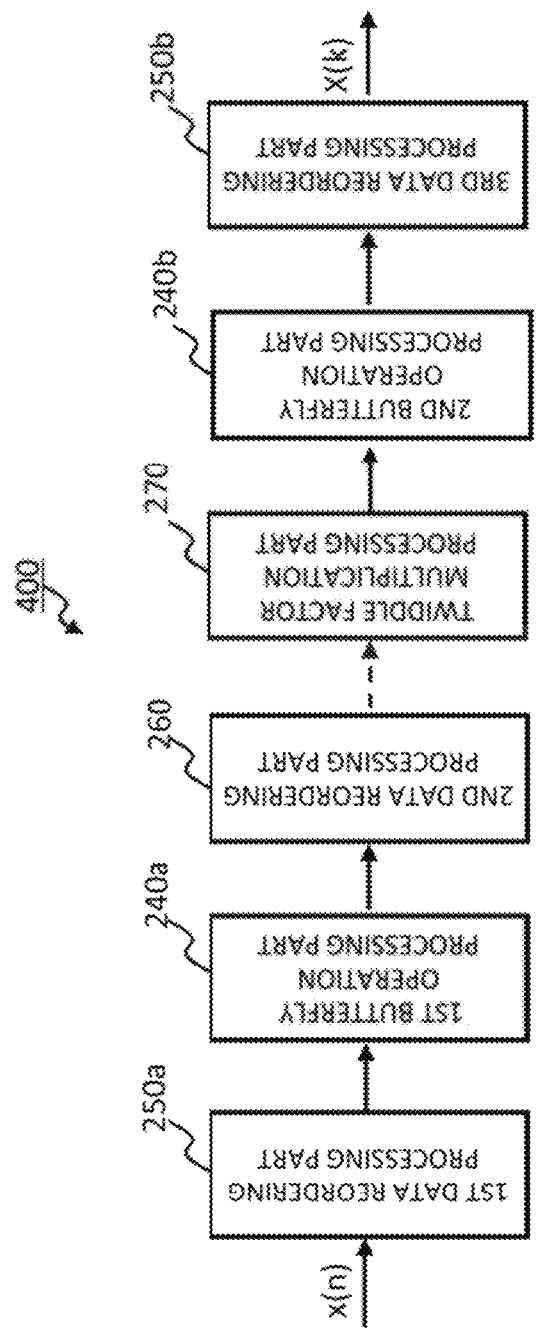
FIG. 14 is a diagram illustrating an example of a configuration of an FFT apparatus according to a second example embodiment of the present invention.

FIG. 14 illustrates a configuration example of an FFT apparatus 400 according to the second example embodiment of the present invention. The FFT apparatus 400, using a pipeline circuit system, processes 64-point FFT decomposed into two-stages of radix-8 butterfly processing, according to the data flow 500 illustrated in FIG. 26.

The FFT apparatus 400 receives time-domain data $x(n)$ ($n=0, 1, \ldots, N-1$), performs Fourier-transformation on $x(n)$ using FFT processing, and generates and outputs frequency-domain signals $X(k)$ ($k=0, 1, \ldots, N-1$). Here, N is a positive integer representing the FFT block size, It is assumed that the FFT apparatus 400 performs a 64-point FFT process in 8-data parallel. In this case, the FFT apparatus 400 receives the time-domain data $x(n)$, and generates and outputs the frequency-domain signals $X(k)$, which have been Fourier-transformed using FFT processing. 64 pieces of data in total, eight pieces at a time in eight cycles, are entered as the input data x(n) in the order illustrated in FIG. 15. The numbers from 0 to 63 shown as contents of a table in FIG. 15 represent an index n of x(n).

More specifically, in the first cycle, eight pieces of data x(0), x(1), . . . , and x(7) constituting a data set P1 are entered. Then, eight pieces of data x(8), x(9), . . . , and x(15) constituting a data set P2 are entered in the second cycle. Similarly, in each cycle from the third to the eighth, data constituting data sets P3 to P8 are entered thereafter.

Likewise, 64 pieces of data, eight pieces of data at a time in eight cycles, are outputted as output data X(k) in the order illustrated in FIG. 15. Note that the numbers from 0 to 63 shown as contents of the table in FIG. 15 represent an index k of X(k).

More specifically, in the first cycle, eight pieces of data X(0), X(1), . . . , and X(7) constituting the data set P1 are outputted. Eight pieces of data X(8), X(9), . . . , and X(15) constituting the data set P2 are outputted in the second cycle. Similarly, in each cycle from the third to the eighth, data constituting the data sets P3 to P8 are outputted thereafter.

The FFT apparatus 400 includes a first data reordering processing part 250a, a first butterfly operation processing part 240a, a second data reordering processing part 260, a twiddle factor multiplication processing part 270, a second butterfly operation processing part 240b, and a third data reordering processing part 250b.

The FFT apparatus 400 performs first data reordering processing, first butterfly operation processing, second data reordering processing, twiddle factor multiplication processing, second butterfly operation processing, and third data reordering processing, in pipeline processing.

The first data reordering processing part 250a and the second data reordering processing part 260 are buffer circuits that rearrange data. The first data reordering processing part 250a and the second data reordering processing part 260 rearrange a data sequence before and after the first butterfly operation processing part 240a, respectively, based on data dependency in an FFT processing algorithm.

Likewise, the third data reordering processing part 250b is a buffer circuit that rearranges data. In other words, the third data reordering processing part 250b rearranges a data sequence after the second butterfly operation processing part 240b based on the data dependency in an algorithm of the FFT processing.

More specifically, the first data reordering processing part 250a rearranges a "sequential order" illustrated in FIG. 15, which is the input order of the input data x(n), into a "bit reverse order" illustrated in FIG. 16, the order in which the data is supplied to the first butterfly operation processing part 240a.

Figure 26:
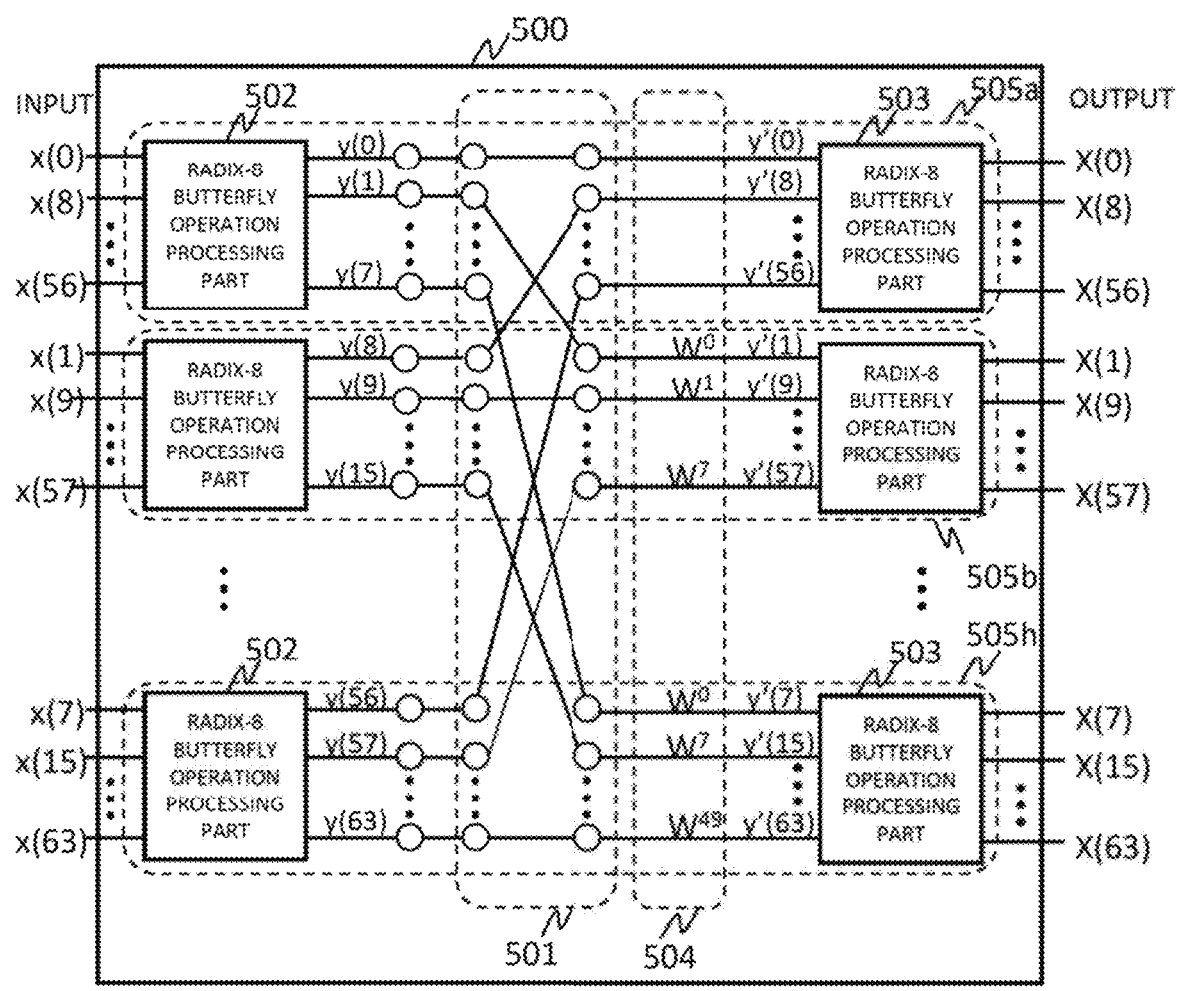
FIG. 26 is a diagram illustrating a data flow of a 64-point FFT processing.
Figure 28:
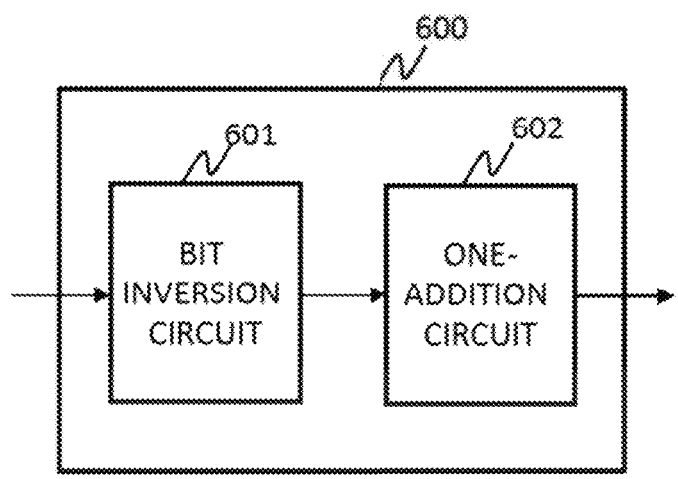
FIG. 28 is a diagram illustrating an example of a configuration of a conversion circuit.

The bit reverse order illustrated in FIG. 16 corresponds to input data sets supplied to the radix-S butterfly operation processing part 502 in the first stage in the data flow diagram illustrated in FIG. 26.

More specifically, in a first cycle, eight pieces of data x(0), x(8), . . . , and x(56) constituting a data set Q1 are entered. Then, eight pieces of data x(1), x(9), . . . , x(57) constituting a data set Q2 are entered in a second cycle. Similarly, in each cycle from a third to an eighth, data constituting data sets Q3 to 8 are entered thereafter.

The sequential order denotes the order of the eight data sets P1, P2, P3, P4, P5, P6, P7, and P8 as illustrated in FIG. 15. A data set Ps (where s is a value representing the order of a processing cycle; s=1, 2, . . . , 8) is constituted by eight pieces of data sequentially arranged from ps(0) to ps(7), respectively. When x(0) to x(63), 64 pieces of data in total, eight pieces at a time in eight cycles, are entered in the order illustrated in FIG. 15, ps(i) (i=0, . . . , 7) is given as follows, $$ps(i)=x[8\times(s-1)+i]$$

The data sets are arranged in the order of P1, P2, P3, P4, P5, P6, P7, and P8 corresponding to the progress of the processing cycles. In the "sequential order," s sets of data sets are created by sequentially arranging i×s pieces of data from the first set, by every i pieces of data in the order of data, and the data sets are arranged in the order of cycles.

The bit reverse order denotes the order of the eight data sets Q1, Q2, Q3, Q4, Q5, Q6, Q7, and Q8 illustrated in FIG. 16. A data set Qs (where s is a value representing the order of a processing cycle; s=1, 2, . . . , 8) is constituted by eight pieces of data sequentially arranged from qs(0) to qs(7), respectively. For 64 pieces of data x(0) to x(63) supplied in the sequential order, qs(i) (i=0, . . . , 7) is given as follows.

$$qs(i)=x[(s-1)+8\times i]$$

The data sets are arranged in the order of Q1, Q2, Q3, Q4, Q5, Q6, Q7, and Q8 corresponding to the progress of the processing cycles. In the bit reverse order, s pieces out of is pieces of data supplied in the sequential order are arranged from the first piece in the order of cycles, and i pieces of data in the same cycle are arranged in the order of data as a set.

Each data set in the bit reverse order is uniquely determined if each data set in the sequential order is configured. The i-th data Qs(i) (i=0, . . . , 7) out of data constituting each data set Qs (s=1, . . . , 8) in the bit reverse order is the (s−1)-th piece of data Pi+1 (s−1) in the (i+1)-th cycle according to the sequential order. That is, $$Qs(i)=Pi+1(s-1)$$

Qs(i) and Pi+1 (s−1) have a relationship in which the progress order of cycles is replaced by the order of data positions with respect to pieces of data constituting each data set. Hence, if pieces of data supplied in the bit reverse order are rearranged according to the bit reverse order, they will form pieces of data in the sequential order.

Each row ps(i) in FIG. 15 and eight rows qs(i) in FIG. 16 represent the i-th data to be supplied in the subsequent stage. Each of eight numerals included in each data set is an identifier identifying one of FFT points, and is concretely the index n in x(n).

Note that the sequential order and the bit reverse order are not limited to those illustrated in FIGS. 15 and 16. Each data set in the sequential order can be created by sequentially arranging data according to the number of FFT points, the number of cycles, and the number of data processed in parallel, as described above. Each data set in the bit reverse order can be created by replacing the order of cycle progression with the order of data position, for data supplied in the sequential order, as described above.

The first butterfly operation processing part 240a is a butterfly operation processing circuit that performs the first butterfly operation processing (502) (the first butterfly operation process) of the radix-8 butterfly operation processing performed twice in the data flow 500 illustrated in FIG. 26.

The first butterfly operation processing part 240a outputs the results of the butterfly operation processing in the sequential order illustrated in FIG. 15 as data y(n) (n=0, 1, . . . , 63).

The second data reordering processing part 260 rearranges the data y(n) outputted in the sequential order by the first butterfly operation processing part 240a into the bit reverse order as illustrated in FIG. 16, in order to be supplied to the second butterfly operation processing part 240*b*.

The twiddle factor multiplication processing part 270 is a circuit that processes complex rotation on a complex plane in an FFT operation after the first butterfly operation processing, and corresponds to the twiddle factor multiplication processing part 504 in the data flow 500 illustrated in FIG. 26. Data rearrangement is not performed in the twiddle factor multiplication processing.

The second butterfly operation processing part 240*b* is a butterfly operation processing circuit that performs the second radix-8 butterfly operation processing (503) in the data flow diagram illustrated in FIG. 26.

The second butterfly operation processing part 240*b* performs the butterfly operation processing on data y'(n) (n=0, 1, . . . , 63) supplied in the bit reverse order after the twiddle factor multiplication processing, and outputs the results X(k) (n=0, 1, . . . 63), also in the bit reverse order.

The third data reordering processing part 250*b* rearranges the data X(k) outputted in the bit reverse order by the second butterfly operation processing part 240*b* into the sequential order illustrated in FIG. 15.

The data reordering processing part realizes data reordering processing according to the sequential order illustrated in FIG. 15 and the bit reverse order illustrated in FIG. 16 respectively, by temporarily storing received data and controlling selection and output of the stored data. The following describes a concrete example of the data reordering processing part.

Figure 17:
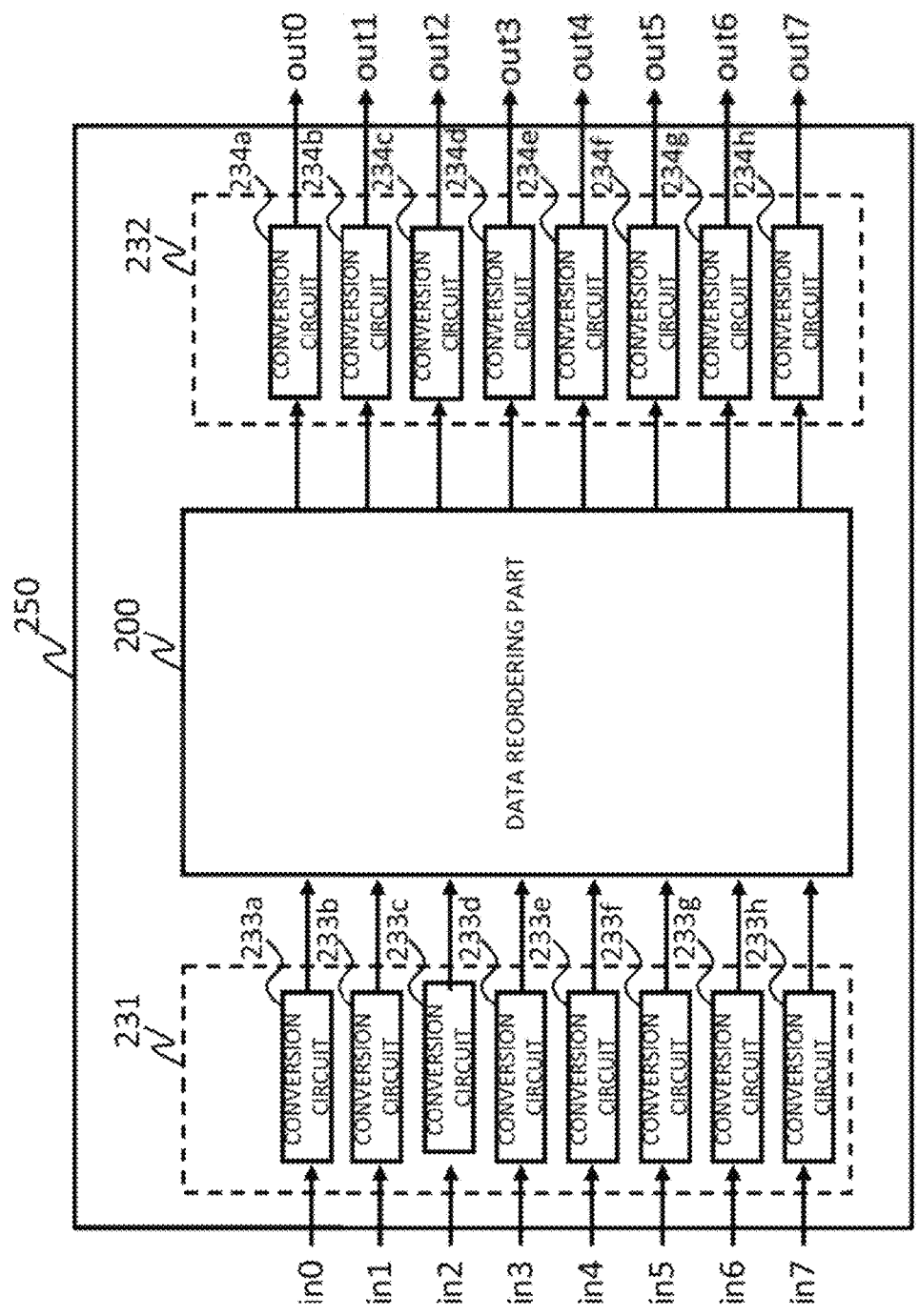
FIG. 17 is a diagram illustrating an example of a configuration of a data reordering processing part according to the second example embodiment of the present invention.

In FIG. 14, the first data reordering processing part 250*a*, and the third data reordering processing part 250*b* can be realized by the data reordering processing part 250 illustrated in FIG. 17 for example.

Referring to FIG. 17, the data reordering processing part 250 includes a conversion circuit 231, a data reordering part 200 (data reordering means), and a conversion circuit 232. The conversion circuit 231 converts input data represented in a two's complement representation received in the sequential order into a sign magnitude—representation, and then the data reordering part 200 performs data reordering processing from the sequential order to the bit reverse order and data reordering processing from the bit reverse order to the sequential order in the sign magnitude—representation. Then, the conversion circuit 232 converts the sign magnitude—representation into a two's complement representation and outputs the result.

Figure 18:
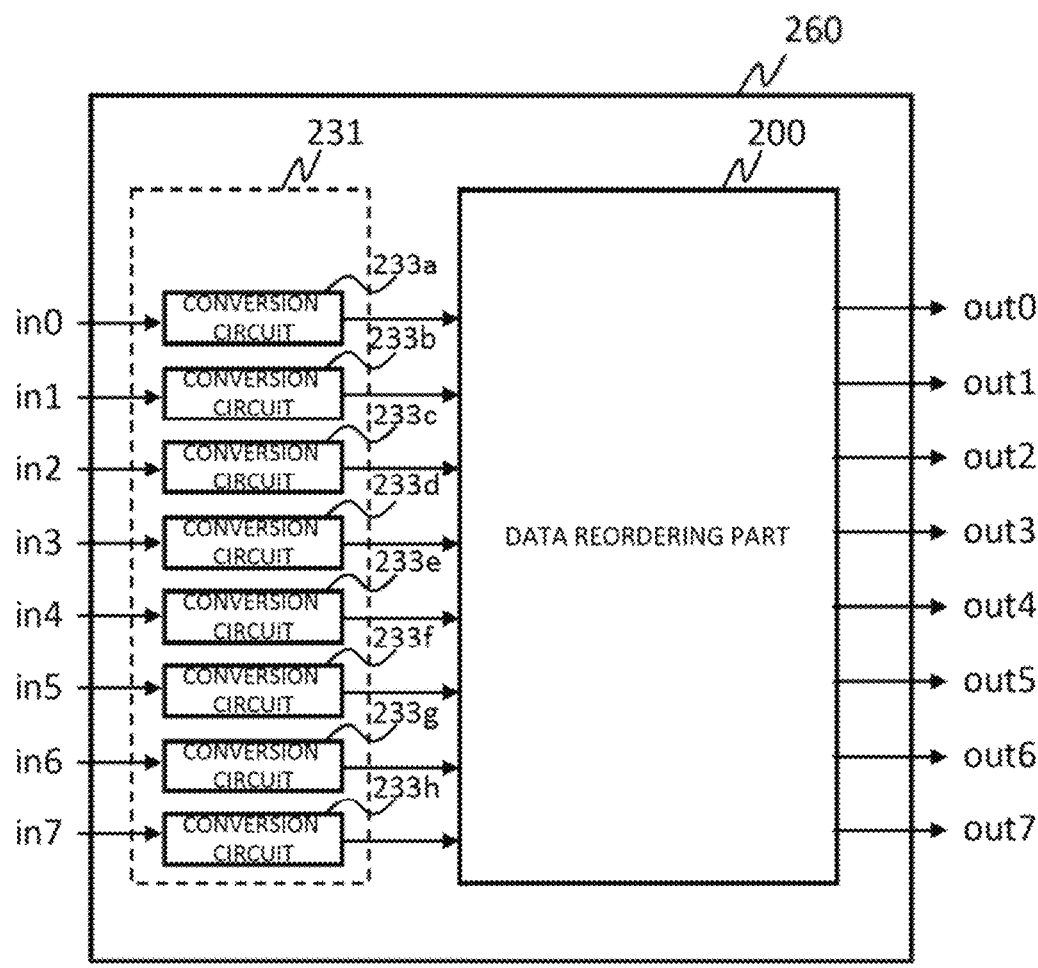
FIG. 18 is a diagram illustrating an example of a configuration of a data reordering processing part according to the second example embodiment of the present invention.

The data reordering processing part 260 as shown in FIG. 14 can be realized by a data reordering processing part 260 as shown in FIG. 18. Referring to FIG. 18, the data reordering processing part 260 is configured by a conversion circuit 231 and a data reordering part (data reordering means) 200. The conversion circuit 231 converts input data in a two's complement representation received in a sequential order into a sign magnitude—representation, and then, the data reordering part (data reordering means) 200 performs data reordering processing from the sequential order to the bit reverse order in the sign magnitude-representation and outputs the result in the sign magnitude—representation as it is.

In FIG. 17 and FIG. 18, the conversion circuit 231 is constituted by conversion circuits 233*a* to 233*h*, and converts the data represented in a two's complement representation which is received in parallel into a sign magnitude—representation, respectively. The conversion circuits 233*a* to 233*h* can be configured by the conversion circuit 10 shown in FIG. 4.

In FIG. 17, the conversion circuit 232 is constituted by conversion circuits 234*a* to 234*h*, and converts the data represented in a sign magnitude—representation which is received in parallel into a two's complement representation, respectively. The conversion circuits 234*a* to 234*h* can be configured by the conversion circuit 10 shown in FIG. 4.

Figure 19:
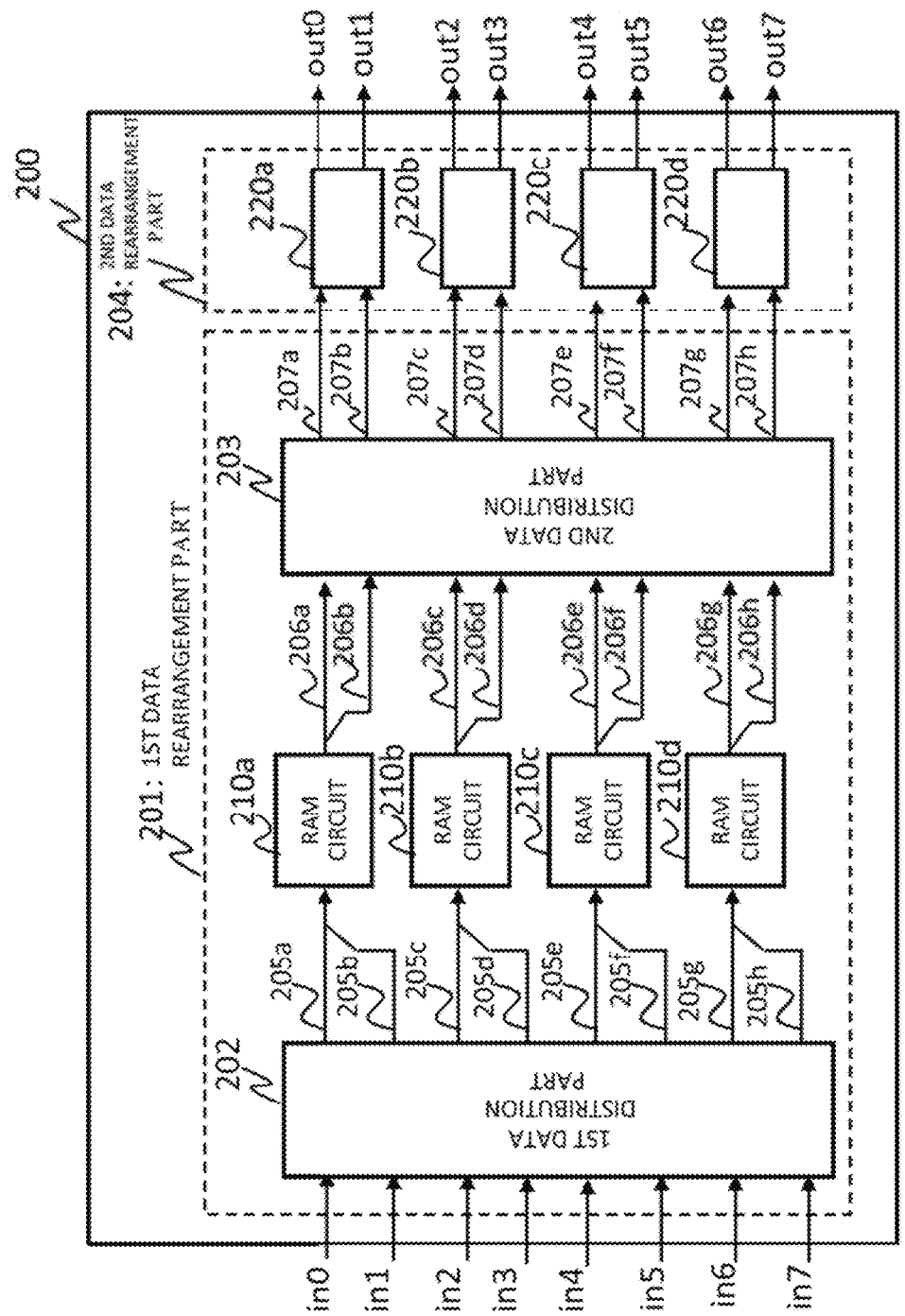
FIG. 19 is a diagram illustrating an example of a configuration of a data reordering part according to the second example embodiment of the present invention.

FIG. 19 illustrates an example of a configuration of a data reordering part (data reordering means) 200 of FIGS. 17 and 18. Referring to FIG. 19, the data reordering part 200 includes a first data rearrangement part (first data rearrangement means) 201, a second data rearrangement part (second data rearrangement means) 204. Data reordering processing from the sequential order to the bit reverse order and data reordering processing from the bit reverse order to the sequential order are performed by two steps of the first data rearrangement part (first data rearrangement means) 201 and the second data rearrangement part (second data rearrangement means) 204.

The data reordering processing in the data reordering part (data reordering means) 200 shown in FIG. 19 will be concretely described by taking the data reordering processing from the sequential order to the bit reverse order as an example.

The first data rearrangement part (first data rearrangement means) 201 rearranges data in a "sequential order" shown in FIG. 20 into data in an "intermediate order" shown in FIG. 21 as the first step rearrangement. The "intermediate order" illustrated in FIG. 21 is an order after performing rearrangement as indicated by arrows on data sets each constituted by four pieces of data indicated by a dotted line, in the "sequential order" illustrated in FIG. 20.

In more detail, the "intermediate order" illustrated in FIG. 21 is achieved by exchanging positions of the following data sets in the sequential order in FIG. 20.
A data set constituted by {2, 3, 10, 11} rearranged with a data set constituted by {16, 17, 24, 25},
A data set constituted by {4, 5, 12, 13} rearranged with a data set constituted by {32, 33, 40, 41},
A data set constituted by {6, 7, 14, 15} rearranged with a data set constituted by {48, 49, 56, 57},
A data set constituted by {20, 21, 28, 29} rearranged with a data set constituted by {34, 35, 42, 43}
A data set constituted by {22, 23, 30, 31} rearranged with a data set constituted by {50, 51, 58, 59}
A data set constituted by {38, 39, 46, 47} rearranged with a data set constituted by {52, 53, 60, 61}

Next, as the second step of rearrangement, the second data rearrangement part (second data rearrangement means) 204 performs rearrangement processing from the "intermediate order" illustrated in FIG. 21 into the "bit reverse order" illustrated in FIG. 16 while staying in the sign magnitude—representation.

In more detail, in the intermediate order illustrated in FIG. 21, this is an order after performing internal rearrangement within each data set as indicated by arrows for each data set constituted by four pieces of data indicated by a dotted line.

In other words, the "bit reverse order" illustrated in FIG. 16 is achieved, in the "intermediate order" illustrated in FIG. 21, by respectively
swapping between 1 and 8 in a data set constituted by {0, 1, 8, 9},
swapping between 3 and 10 in the data set constituted by {2, 3, 10, 11},
swapping between 5 and 12 in the data set constituted by {4, 5, 12, 13},
swapping between 7 and 14 in the data set constituted by {6, 7, 14, 15,} swapping between 17 and 24 in the data set constituted by {16, 17, 24, 25},
swapping between 19 and 26 in a data set constituted by {18, 19, 26, 27},
swapping between 21 and 28 in the data set constituted by {20, 21, 28, 29},
swapping between 23 and 30 in the data set constituted by {22, 23, 30, 31},
swapping between 33 and 40 in the data set constituted by {32, 33, 40, 41},
swapping between 35 and 42 in the data set constituted by {34, 35, 42, 43},
swapping between 37 and 44 in a data set constituted by {36, 37, 44, 45},
swapping between 39 and 46 in the data set constituted by {38, 39, 46, 47},
swapping between 49 and 56 in the data set constituted by {48, 49, 56, 57},
swapping between 51 and 58 in the data set constituted by {50, 51, 58, 59},
swapping between 53 and 60 in the data set constituted by {52, 53, 60, 61}, and
swapping between 55 and 62 in a data set constituted by {54, 55, 62, 63}.

Referring to FIG. 19, in the data reordering part 200, the first data rearrangement part (first data rearrangement means) 201 includes a first data distribution part (first data distribution means) 202, four RAM circuits 210a, 210b, 210c, and 210d, and a second data distribution part (second data distribution means) 203.

The first data distribution part 202 simultaneously receives eight pieces of data from eight inputs in0 to in7, performs data distribution processing, and outputs the results to eight outputs 205a to 205h.

The RAM circuit 210a stores two pieces of the data as a set, outputted to 205a and 205b by the first data distribution part 202, and outputs them also as two pieces of data to 206a and 206b.

Similarly, the RAM circuit 210b stores two pieces of the data as a set, outputted to 205c and 205d by the first data distribution part 202, and outputs them also as two pieces of data to 206c and 206d.

The RAM circuit 210c stores two pieces of the data as a set, outputted to 205e and 205f by the first data distribution part 202, and outputs them also as two pieces of data to 206e and 206f.

The RAM circuit 210d stores two pieces of the data as a set, outputted to 205g and 205h by the first data distribution part 202, and outputs them also as two pieces of data to 206g and 206h.

The second data distribution part 203 simultaneously receives eight pieces of data from eight inputs 206a to 206h, performs data distribution processing, and outputs the results to eight outputs 207a to 207h.

The second data rearrangement part (second data rearrangement means) 204 is constituted by four intra-data set rearrangement part 220a to 220d.

The intra-data set rearrangement part 220a receives two inputs 207a and 207b, performs reordering processing inside a data set constituted by four pieces of data, and outputs the result to outputs out0 and out1.

Similarly, the intra-data set rearrangement part 220b receives two inputs 207c and 207d, performs reordering processing inside a data set constituted by four pieces of data, and outputs the result to outputs out2 and out3.

The intra-data set rearrangement part 220c receives two inputs 207e and 207f, performs reordering processing inside a data set constituted by four pieces of data, and outputs the result to outputs out4 and out5.

The intra-data set rearrangement part 220d receives two inputs 207g and 207h, performs reordering processing inside a data set constituted by four pieces of data, and outputs the result to outputs out6 and out7. When the data reordering part 200 of FIG. 19 configures the data reordering part 200 of the second data reordering processing part 260 of FIG. 18, the outputs out0 to out7 of the second data rearrangement part (second data rearrangement means) 204 of FIG. 19 correspond to the outputs out0 to out7 of the second data reordering processing part 260 of FIG. 18. When the data reordering part 200 of FIG. 19 configures the data reordering part 200 of the data reordering processing part 250 of FIG. 17, outputs out0 to out7 of the second data rearrangement part (second data rearrangement means) 204 of FIG. 19 correspond to the respective inputs of the conversion circuit 232 (conversion circuits 234a to 234h) of FIG. 17.

Next, a specific operation of the data reordering part 200 will be described. FIG. 22 is a time chart for illustrating the operation of the data reordering part 200. The horizontal axis in FIG. 22 represents time (denoted by cycle numbers), and each row represents the data in the data line (input/output) of each part in FIG. 19. In FIG. 22, element numbers 0 to 63 in arrays of the cycles (columns) and the data lines (rows) denote data x(0), . . . , x(63) (for example each data in the data sets P1, . . . , P8 in FIG. 15).

The data reordering part 200 receives 64 pieces of data 0 to 63 in 8-data parallel in the sequential order in eight cycles t0 to t7, and outputs 64 pieces of data 0 to 63 in 8-data parallel in the bit reverse order in eight cycles t8 to t15.

First, the operation of the first data rearrangement part (first data rearrangement means) 201 will be described in detail. The first data rearrangement part 201 receives 64 pieces of data 0 to 63 in 8-data parallel in the sequential order in eight cycles t0 to t7, and outputs 64 pieces of data 0 to 63 in 8-data parallel in an intermediate order in eight cycles t8 to t15.

The first data distribution part 202 performs the following operation. Note that the first data distribution part 202 which is a subject of each operation is omitted.

In the cycles t0 and t1,
outputs the data received from in0 to 205a,
outputs the data received from in1 to 205b,
outputs the data received from in2 to 205c,
outputs the data received from in3 to 205d,
outputs the data received from in4 to 205e,
outputs the data received from in5 to 205f,
outputs the data received from in6 to 205g, and
outputs the data received from in7 to 205h.
In the cycles t2 and t3,
outputs the data received from in0 to 205c,
outputs the data received from in1 to 205d,
outputs the data received from in2 to 205e,
outputs the data received from in3 to 205f,
outputs the data received from in4 to 205g,
outputs the data received from in5 to 205h,
outputs the data received from in6 to 205a, and
outputs the data received from in7 to 205b.
In the cycles t4 and t5,
outputs the data received from in0 to 205e,
outputs the data received from in1 to 205f,
outputs the data received from in2 to 205g,
outputs the data received from in3 to 205h,
outputs the data received from in4 to 205a, outputs the data received from in5 to 205*b*,
outputs the data received from in6 to 205*c*, and
outputs the data received from in7 to 205*d*.
In the cycles t6 and t7,
outputs the data received from in0 to 205*g*,
outputs the data received from in1 to 205*h*,
outputs the data received from in2 to 205*a*,
outputs the data received from in3 to 205*b*,
outputs the data received from in4 to 205*c*,
outputs the data received from in5 to 205*d*,
outputs the data received from in6 to 205*e*, and
outputs the data received from in7 to 205*f*.

In other words, the first data distribution part 202 performs the following operation in the cycles t0 to t7.

(1) In the cycle t0, receives eight pieces of data 0 to 7 from the inputs in0 to in7, respectively, and outputs the eight pieces of data 0 to 7 to the outputs 205*a* to 205*h*, respectively.

(2) In the cycle t1, receives eight pieces of data 8 to 15 from the inputs in0 to in7, respectively, and outputs the eight pieces of data 8 to 15 to the outputs 205*a* to 205*h*, respectively.

(3) In the cycle t2, receives eight pieces of data 16 to 23 from the inputs in0 to in7, respectively, and outputs the eight pieces of data, 22, 23 and 16 to 21 to the outputs 205*a* to 205*h*, respectively.

(4) In the cycle t3, receives eight pieces of data 24 to 31 from the inputs in0 to in7, respectively, and outputs the eight pieces of data, 30, 31 and 24 to 29 to the outputs 205*a* to 205*h*, respectively.

(5) In the cycle t4, receives eight pieces of data 32 to 39 from the inputs in0 to in7, respectively, and outputs the eight pieces of data, 36 to 39 and 32 to 35 to the outputs 205*a* to 205*h*, respectively.

(6) In the cycle t5, receives eight pieces of data 40 to 47 from the inputs in0 to in7, respectively, and outputs the eight pieces of data, 44 to 47 and 40 to 43 to the outputs 205*a* to 205*h*, respectively.

(7) In the cycle t6, receives eight pieces of data 48 to 55 from the inputs in0 to in7, respectively, and outputs the eight pieces of data, 50 to 55, 48 and 49 to the outputs 205*a* to 205*h*, respectively.

(8) In the cycle t7, receives eight pieces of data 56 to 63 from the inputs in0 to in7, respectively, and outputs the eight pieces of data, 58 to 63, 56 and 57 to the outputs 205*a* to 205*h*, respectively.

Note that the sets of eight pieces of data 0 to 7, 8 to 15, 16 to 23, 24 to 31, 32 to 39, 40 to 47, 48 to 55, and 56 to 63 in (1) to (8) above correspond to x(0) to x(7) constituting the data set P1, x(8) to x(15) constituting the data set P2, x(16) to x(23) constituting the data set P3, x(24) to x(31) constituting the data set P4, x(32) to x(39) constituting the data set P5, x(40) to x(47) constituting the data set P6, x(48) to x(55) constituting the data set P7, and x(56) to x(63) constituting the data set P8 in FIG. 15, respectively, for example. In other words, the number n in the data represents the index n of x(n). Hereinafter, data will be denoted in the same manner.

As described above, the first data distribution part 202 performs rotation (rotate) processing on eight pieces of data simultaneously received in parallel and outputs the results, and may be easily realized by, for example, a shift circuit. For example, in a register that stores and holds eight pieces of data from in0 to in7 in parallel, eight pieces of data from in6, in7, and in0 to in5 in this order can be obtained by rotating right by two pieces of data in, for example, the cycles t2 and t3. Eight pieces of data from in4 to in7 and in0 to in3 in this order can be obtained by rotating left or right by, for example, four pieces of data in the cycles t4 and t5. In the cycles t6 and t7, eight pieces of data from in2 to in7 and in0 to in1 in this order can be obtained by rotating left by, for example, two pieces of data. Eight pieces of data are outputted to the outputs 205*a* to 205*h* in parallel, respectively.

Next, the RAM circuit 210*a* performs the following operation. Note that the outputs 205*a* and 205*b* of the first data distribution part 202 are referred to as inputs 205*a* and 205*b* in the description of the RAM circuit 210*a* since they are respectively connected to an input of the RAM circuit 210*a*. The RAM circuit 210*a* which is a subject of the following operation is omitted. The same applies to inputs of the RAM circuits 210*b* to 210*d*.

(1) Outputs received data 0 and 1 from the inputs 205*a* and 205*b* in the cycle t0 to the outputs 206*a* and 206*b* in the cycle t8.

(2) Outputs received data 8 and 9 from the inputs 205*a* and 205*b* in the cycle t1 to the outputs 206*a* and 206*b* in the cycle t9.

(3) Outputs received data 22 and 23 from the inputs 205*a* and 205*b* in the cycle t2 to the outputs 206*a* and 206*b* in the cycle t14.

(4) Outputs received data 30 and 31 from the inputs 205*a* and 205*b* in the cycle t3 to the outputs 206*a* and 206*b* in the cycle t15.

(5) Outputs received data 36 and 37 from the inputs 205*a* and 205*b* in the cycle t4 to the outputs 206*a* and 206*b* in the cycle t12.

(6) Outputs received data 44 and 45 from the inputs 205*a* and 205*b* in the cycle t5 to the outputs 206*a* and 206*b* in the cycle t13.

(7) Outputs received data 50 and 51 from the inputs 205*a* and 205*b* in the cycle t6 to the outputs 206*a* and 206*b* in the cycle t10.

(8) Outputs received data 58 and 59 from the inputs 205*a* and 205*b* in the cycle t7 to the outputs 206*a* and 206*b* in the cycle t11.

Similarly, the RAM circuit 210*b* performs the following operation.

(1) Outputs received two pieces of data 2 and 3 from the inputs 205*c* and 205*d* in the cycle t0 to the outputs 206*c* and 206*d* in the cycle t10.

(2) Outputs received two pieces of data 10 and 11 from the inputs 205*c* and 205*d* in the cycle t1 to the outputs 206*c* and 206*d* in the cycle t11.

(3) Outputs received two pieces of data 16 and 17 from the inputs 205*c* and 205*d* in the cycle t2 to the outputs 206*c* and 206*d* in the cycle t8.

(4) Outputs received two pieces of data 24 and 25 from the inputs 205*c* and 205*d* in the cycle t3 to the outputs 206*c* and 206*d* in the cycle t9.

(5) Outputs received two pieces of data 38 and 39 from the inputs 205*c* and 205*d* in the cycle t4 to the outputs 206*c* and 206*d* in the cycle t14.

(6) Outputs received two pieces of data 46 and 47 from the inputs 205*c* and 205*d* in the cycle t5 to the outputs 206*c* and 206*d* in the cycle t15.

(7) Outputs received two pieces of data 52 and 53 from the inputs 205*c* and 205*d* in the cycle t6 to the outputs 206*c* and 206*d* in the cycle t12.

(8) Outputs received two pieces of data 60 and 61 from the inputs 205*c* and 205*d* in the cycle t7 to the outputs 206*c* and 206*d* in the cycle t13.

Similarly, the RAM circuit 210*c* performs the following operation.

(1) Outputs received two pieces of data 4 and 5 from the inputs 205e and 205f in the cycle t0 to the outputs 206e and 206f in the cycle t12.
(2) Outputs received two pieces of data 12 and 13 from the inputs 205e and 205f in the cycle t1 to the outputs 206e and 206f in the cycle t13.
(3) Outputs received two pieces of data 18 and 19 from the inputs 205e and 205f in the cycle t2 to the outputs 206e and 206f in the cycle t10.
(4) Outputs received two pieces of data 26 and 27 from the inputs 205e and 205f in the cycle t3 to the outputs 206e and 206f in the cycle t11.
(5) Outputs received two pieces of data 32 and 33 from the inputs 205e and 205f in the cycle t4 to the outputs 206e and 206f in the cycle t8.
(6) Outputs received two pieces of data 40 and 41 from the inputs 205e and 205f in the cycle t5 to the outputs 206e and 206f in the cycle t9.
(7) Outputs received two pieces of data 54 and 55 from the inputs 205e and 205f in the cycle t6 to the outputs 206e and 206f in the cycle t14.
(8) Outputs received two pieces of data 62 and 63 from the inputs 205e and 205f in the cycle t7 to the outputs 206e and 206f in the cycle t15.

Similarly, the RAM circuit 210d performs the following operation.
(1) Outputs received two pieces of data 6 and 7 from the inputs 205g and 205h in the cycle t0 to the outputs 206g and 206h in the cycle t14.
(2) Outputs received two pieces of data 14 and 15 from the inputs 205g and 205h in the cycle t1 to the outputs 206g and 206h in the cycle t15.
(3) Outputs received two pieces of data 20 and 21 from the inputs 205g and 205h in the cycle t2 to the outputs 206g and 206h in the cycle t12.
(4) Outputs received two pieces of data 28 and 29 from the inputs 205g and 205h in the cycle t3 to the outputs 206g and 206h in the cycle t13.
(5) Outputs received two pieces of data 34 and 35 from the inputs 205g and 205h in the cycle t4 to the outputs 206g and 206h in the cycle (10.
(6) Outputs received two pieces of data 42 and 43 from the inputs 205g and 205h in the cycle t5 to the outputs 206g and 206h in the cycle t11.
(7) Outputs received two pieces of data 48 and 49 from the inputs 205g and 205h in the cycle t6 to the outputs 206g and 206h in the cycle t8.
(8) Outputs received two pieces of data 56 and 57 from the inputs 205g and 205h in the cycle t7 to the outputs 206g and 206h in the cycle t9.

Next, the second data distribution part 203 performs the following operation. Note that the outputs 206a to 206h of the RAM circuits 210a to 210d are referred to as inputs 206a to 206h in the description of the second data distribution part 203 since they are connected to the inputs of the second data distribution part 203. The second data distribution part 203 which is a subject of the following operation is omitted.

In the cycles t8 and t9,
outputs the data received from 206a to 207a,
outputs the data received from 206b to 207b,
outputs the data received from 206c to 207c,
outputs the data received from 206d to 207d,
outputs the data received from 206e to 207e,
outputs the data received from 206f to 207f,
outputs the data received from 206g to 207g, and
outputs the data received from 206h to 207h.

In the cycles t10 and t11,
outputs the data received from 206a to 207g,
outputs the data received from 206b to 207h,
outputs the data received from 206c to 207a,
outputs the data received from 206d to 207b,
outputs the data received from 206e to 207c,
outputs the data received from 206f to 207d,
outputs the data received from 206g to 207e, and
outputs the data received from 206h to 207f.

In the cycles t12 and t13,
outputs the data received from 206a to 207e,
outputs the data received from 206b to 207f,
outputs the data received from 206c to 207g,
outputs the data received from 206d to 207h,
outputs the data received from 206e to 207a,
outputs the data received from 206f to 207b,
outputs the data received from 206g to 207c, and
outputs the data received from 206h to 207d.

In the cycles t14 and t15,
outputs the data received from 206a to 207c,
outputs the data received from 206b to 207d,
outputs the data received from 206c to 207e,
outputs the data received from 206d to 207f,
outputs the data received from 206e to 207g,
outputs the data received from 206f to 207h,
outputs the data received from 206g to 207a, and
outputs the data received from 206h to 207b.

In other words, the second data distribution part 203 performs the following operation.
(1) In the cycle t8, receives eight pieces of data 0, 1, 16, 17, 32, 33, 48, and 49 from the inputs 206a to 206h, respectively, and outputs the eight pieces of data 0, 1, 16, 17, 32, 33, 48, and 49 to the outputs 207a to 207h, respectively.
(2) In the cycle t9, receives eight pieces of data 8, 9, 24, 25, 40, 41, 56, and 57 from the inputs 206a to 206h, respectively, and outputs the eight pieces of data 8, 9, 24, 25, 40, 41, 56, and 57 to the outputs 207a to 207h, respectively.
(3) In the cycle t10, receives eight pieces of data 50, 51, 2, 3, 18, 19, 34, and 35 from the inputs 206a to 206h, respectively, and outputs the eight pieces of data 2, 3, 18, 19, 34, 35, 50, and 51 to the outputs 207a to 207h, respectively.
(4) In the cycle t11, receives eight pieces of data 58, 59, 10, 11, 26, 27, 42, and 43 from the inputs 206a to 206h, respectively, and outputs the eight pieces of data 10, 11, 26, 27, 42, 43, 58, and 59 to the outputs 207a to 207h, respectively.
(5) In the cycle t12, receives eight pieces of data 36, 37, 52, 53, 4, 5, 20, and 21 from the inputs 206a to 206h, respectively, and outputs the eight pieces of data 4, 5, 20, 21, 36, 37, 52, and 53 to the outputs 207a to 207h, respectively.
(6) In the cycle t13, receives eight pieces of data 44, 45, 60, 61, 12, 13, 28, and 29 from the inputs 206a to 206h, respectively, and outputs the eight pieces of data 12, 13, 28, 29, 44, 45, 60, and 61 to the outputs 207a to 207h, respectively.
(7) In the cycle t14, receives eight pieces of data 22, 23, 38, 39, 54, 55, 6, and 7 from the inputs 206a to 206h, respectively, and outputs the eight pieces of data 6, 7, 22, 23, 38, 39, 54, and 55 to the outputs 207a to 207h, respectively.
(8) In the cycle t15, receives eight pieces of data 30, 31, 46, 47, 62, 63, 14, and 15 from the inputs 206a to 206h, respectively, and outputs the eight pieces of data 14, 15, 30, 31, 46, 47, 62, and 63 to the outputs 207*a* to 207*h*, respectively.

As is the case with the first data distribution part 202, the second data distribution part 203 also performs rotation processing on eight pieces of data simultaneously received in parallel and outputs the results, and may be easily realized by, for example, a shift circuit.

Next, the operation of the second data rearrangement part (second data rearrangement means) 204 will be described in detail with reference to FIG. 22. The second data rearrangement part 204 receives 64 pieces of data 0 to 63 in 8-data parallel in the intermediate order in eight cycles t8 to t15, and outputs 64 pieces of data 0 to 63 in 8-data parallel in the bit reverse order in eight cycles t9 to t16.

The intra-data set rearrangement part 220*a* performs the following operation. The intra-data set rearrangement part 220*a* which is a subject of the following operation is omitted.

From the inputs 207*a* and 207*b*,
receives two pieces of data 0 and 1 in the cycle t8,
receives two pieces of data 8 and 9 in the cycle t9,
to the outputs out0 and out1,
outputs two piece of data 0 and 8 in the cycle t9, and
outputs two pieces of data 1 and 9 in the cycle t10.
Similarly, from the inputs 207*a* and 207*b*,
receives two pieces of data 2 and 3 in the cycle t10,
receives two pieces of data 10 and 11 in the cycle t11,
to the outputs out0 and out1,
outputs two piece of data 2 and 10 in the cycle t11, and
outputs two pieces of data 3 and 11 in the cycle t12.
From the inputs 207*a* and 207*b*,
receives two pieces of data 4 and 5 in the cycle t12,
receives two pieces of data 12 and 13 in the cycle t13,
to the outputs out0 and out1,
outputs two piece of data 4 and 12 in the cycle t13, and
outputs two pieces of data 5 and 13 in the cycle t14.
From the inputs 207*a* and 207*b*,
receives two pieces of data 6 and 7 in the cycle t14,
receives two pieces of data 14 and 15 in the cycle t15,
to the outputs out0 and out1,
outputs two piece of data 6 and 14 in the cycle t15, and
outputs two pieces of data 7 and 15 in the cycle t16.

The intra-data set rearrangement part 220*b* performs the following operation. The intra-data set rearrangement part 220*b* which is a subject of the following operation is omitted.

From the inputs 207*c* and 207*d*,
receives two pieces of data 16 and 17 in the cycle t8,
receives two pieces of data 24 and 25 in the cycle t9,
to the outputs out2 and out3,
outputs two piece of data 16 and 24 in the cycle t9, and
outputs two pieces of data 17 and 25 in the cycle t10.
Similarly,
from the inputs 207*c* and 207*d*,
receives two pieces of data 18 and 19 in the cycle t10,
receives two pieces of data 26 and 27 in the cycle t11,
to the outputs out2 and out3,
outputs two piece of data 18 and 26 in the cycle t11, and
outputs two pieces of data 19 and 27 in the cycle t12.
From the inputs 207*c* and 207*d*,
receives two pieces of data 20 and 21 in the cycle t12,
receives two pieces of data 28 and 29 in the cycle t13,
to the outputs out2 and out3,
outputs two piece of data 20 and 28 in the cycle t13, and
outputs two pieces of data 21 and 29 in the cycle t14.
From the inputs 207*c* and 207*d*,
receives two pieces of data 22 and 23 in the cycle t14,
receives two pieces of data 30 and 31 in the cycle t15,
to the outputs out2 and out3,
outputs two piece of data 22 and 30 in the cycle t15, and
outputs two pieces of data 23 and 31 in the cycle t16.

The intra-data set rearrangement part 220*c* performs the following operation. The intra-data set rearrangement part 220*c* which is a subject of the following operation is omitted.

From the inputs 207*e* and 207*f*,
receives two pieces of data 32 and 33 in the cycle t8,
receives two pieces of data 40 and 41 in the cycle t9,
to the outputs out4 and out5,
outputs two piece of data 32 and 40 in the cycle t9, and
outputs two pieces of data 33 and 41 in the cycle t10.
Similarly,
from the inputs 207*e* and 207*f*,
receives two pieces of data 34 and 35 in the cycle t10,
receives two pieces of data 42 and 43 in the cycle t11,
to the outputs out4 and out5,
outputs two piece of data 34 and 42 in the cycle t11, and
outputs two pieces of data 35 and 43 in the cycle t12.
From the inputs 207*e* and 207*f*,
receives two pieces of data 36 and 37 in the cycle t12,
receives two pieces of data 44 and 45 in the cycle t13,
to the outputs out4 and out5,
outputs two piece of data 36 and 44 in the cycle t13, and
outputs two pieces of data 37 and 45 in the cycle t14*s*.
From the inputs 207*e* and 207*f*,
receives two pieces of data 38 and 39 in the cycle t14,
receives two pieces of data 46 and 47 in the cycle t15,
to the outputs out4 and out5,
outputs two piece of data 38 and 46 in the cycle t15, and
outputs two pieces of data 39 and 47 in the cycle t16.

The intra-data set rearrangement part 220*d* performs the following operation. The intra-data set rearrangement part 220*d* which is a subject of the following operation is omitted.

From the inputs 207*g* and 207*h*,
receives two pieces of data 48 and 49 in the cycle t8,
receives two pieces of data 56 and 57 in the cycle t9,
to the outputs out6 and out7,
outputs two piece of data 48 and 56 in the cycle t9, and
outputs two pieces of data 49 and 57 in the cycle t10.
Similarly, from the inputs 207*g* and 207*h*,
receives two pieces of data 50 and 51 in the cycle t10,
receives two pieces of data 58 and 59 in the cycle t11,
to the outputs out6 and out7,
outputs two piece of data 50 and 58 in the cycle t11, and
outputs two pieces of data 51 and 59 in the cycle t12.
From the inputs 207*g* and 207*h*,
receives two pieces of data 52 and 53 in the cycle t12,
receives two pieces of data 60 and 61 in the cycle t13,
to the outputs out6 and out7,
outputs two piece of data 52 and 60 in the cycle t13, and
outputs two pieces of data 53 and 61 in the cycle t14.
From the inputs 207*g* and 207*h*,
receives two pieces of data 54 and 55 in the cycle t14,
receives two pieces of data 62 and 63 in the cycle t5,
to the outputs out6 and out7,
outputs two piece of data 54 and 62 in the cycle t15, and
outputs two pieces of data 55 and 63 in the cycle t16.

As described above, the data reordering part 200 achieves rearrangement from the sequential order to the bit reverse order by performing rearrangement from the sequential order to the intermediate order with the first data rearrangement part 201 and performing rearrangement from the intermediate order to the bit reverse order with the second data rearrangement part 204.

Figure 23:
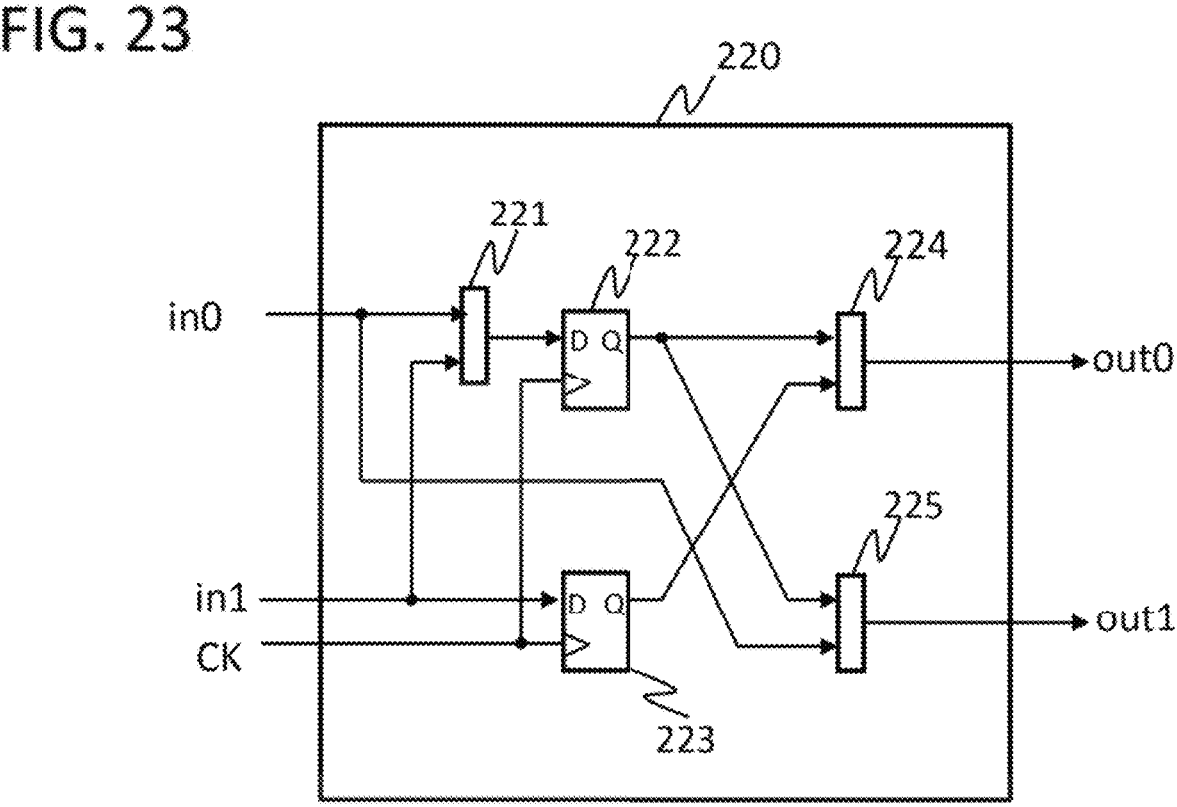
FIG. 23 is a diagram illustrating an example of a configuration of an intra-data set rearrangement parts of the data reordering part according to the second example embodiment of the present invention.

For example, the intra-data set rearrangement parts 220a to 220d constituting the second data rearrangement part 204 may be realized by an intra-data set rearrangement part 220 illustrated in FIG. 23. Referring to FIG. 23, the intra-data set rearrangement part 220 is constituted by selector circuits 221, 224, and 225, and flip-flops 222 and 223.

FIG. 24 is a time chart which shows the operation of the intra-data set rearrangement part 220. In FIG. 24, the intra-data set rearrangement part 220 receives four pieces of data 0, 1, 8, and 9 as a data set from inputs in0 and in1 in cycles t0 and t1, performs rearrangement processing on the pieces within the data set, and outputs four pieces of data 0, 8, 1, and 9 from outputs out0 and out1 in the cycle t1 and cycle t2. More specifically, the intra-data set rearrangement part 220 receives 0 and 1 from the inputs in0 and in1 in the cycle t0, and the selector 221 selects 0 received from the input M0. In the cycle t0, the flip-flop 222 stores 0 selected by the selector 221 and the flip-flop 223 stores 1 received from the input in1.

In the cycle t1, 8 and 9 are received from the inputs in0 and in1, and the selector 221 selects 9 received from the input in1. In the cycle t1, the flip-flop 222 outputs 0 stored therein and stores 9 received from the input in1, and the flip-flop 223 outputs 1 stored therein. In the cycle t1, the selector 224 selects 0 outputted by the flip-flop 222 and outputs it to the output out0, and the selector 225 selects 8 received from the input in0 and outputs it to the output out1.

In the cycle t2, the flip-flop 222 outputs 9 stored therein, and the flip-flop 223 outputs 1 stored therein. In the cycle t2, the selector 224 selects 1 outputted by the flip-flop 223 and outputs it to the output out0, and the selector 225 selects 9 outputted by the flip-flop 222 and outputs it to the output out1.

As above, the data reordering processing was described using rearrangement from the sequential order to the bit reverse order as an example, however, rearrangement from the bit reverse order to the sequential order may also be achieved in two steps by performing rearrangement from the bit reverse order to the intermediate order as the first-step rearrangement, and then by performing rearrangement from the intermediate order into the sequential order as the second-step rearrangement.

Figure 25:
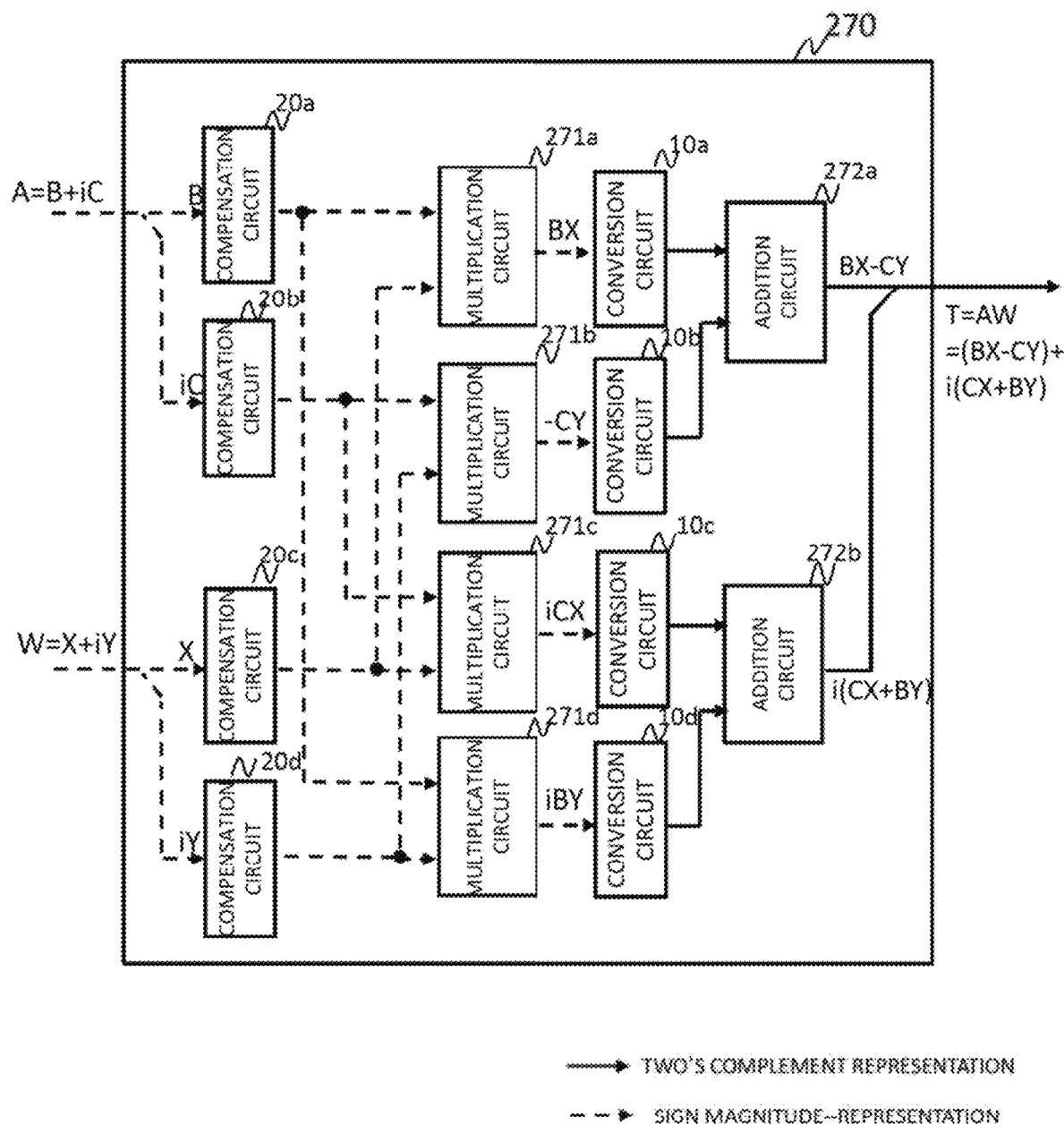
FIG. 25 is a diagram illustrating an example of a configuration of a twiddle factor multiplication processing part according to the second example embodiment of the present invention.

FIG. 25 illustrates an example of a configuration of a twiddle factor multiplication processing part 270. The twiddle factor multiplication processing part 270 receives complex signals represented in a sign magnitude—representation:

$A=B+iC$ and $W=X+iY$ (where $i^2=-1$), and calculates and outputs a result of complex multiplication $T=A \times W=(BX-CY)+i(CX+BY)$.

The twiddle factor multiplication processing part 270 includes compensation circuits 20a to 20d, multiplication circuits 271a to 271d, conversion circuits 10a to 10d, and addition circuits 272a to 272b.

The compensation circuits 20a to 20d can be realized by the compensation circuit 20 shown in FIG. 8, for example.

The compensation circuit 20a performs compensation processing on a real component B of the input complex signal A=B+iC.

Similarly, the compensation circuit 20b performs compensation processing on an imaginary component iC of the input complex signal A=B+iC.

The compensation circuit 20c performs compensation processing on a real component X of the input complex signal W=X+iY.

Similarly, the compensation circuit 20d performs compensation processing on an imaginary component iY of the input complex signal W=X+iY.

The multiplication circuits 271a to 271d can be realized, for example, by performing unsigned multiplication processing with the unsigned operation circuit 43 in the operation circuit 41 shown in FIG. 9.

The multiplication circuit 271a performs multiplication processing on the real component B of the input A represented in a sign magnitude—representation and the real component X of the input W represented in a sign magnitude—representation, and outputs the result BX.

The multiplication circuit 271b performs multiplication processing on the imaginary component iC of the input A represented in a sign magnitude—representation and the imaginary component iY of the input W represented in a sign magnitude—representation, and outputs the result−CY.

The multiplication circuit 271c performs multiplication processing on the imaginary component iC of the input A represented in a sign magnitude—representation and the real component X of the input W represented in a sign magnitude—representation, and outputs the result iCX.

The multiplication circuit 271d performs multiplication processing on the real component B of the input A represented in a sign magnitude—representation and the imaginary component iY of the input W represented in a sign magnitude—representation, and outputs the result BY.

The conversion circuits 10a to 10d can be realized by the conversion circuit 10 shown in FIG. 4, for example.

The conversion circuit 10a converts the signal BX represented in a sign magnitude—representation outputted by the multiplication circuit 271a to a two's complement representation and outputs the result.

The conversion circuit 10b converts the signal −CY represented in a sign magnitude—representation outputted by the multiplication circuit 271b to a two's complement representation and outputs the result.

The conversion circuit 10c converts the signal iCX represented in a sign magnitude—representation outputted by the multiplication circuit 271c to a two's complement representation and outputs the result.

The conversion circuit 10d converts the signal iBY represented in a sign magnitude—representation outputted by the multiplication circuit 271d to a two's complement representation and outputs the result.

The addition circuits 272a and 272b are achieved by an addition circuit that performs addition processing on inputs represented in a two's complement representation.

The addition circuit 272a performs addition processing on the signal BX represented in the two's complement representation outputted by the conversion circuit 10a and the signal −CY represented in the two's complement representation outputted by the conversion circuit 10b and outputs the result BX−CY.

The addition circuit 272b performs addition processing on the signal iCX represented in the two's complement representation outputted by the conversion circuit 10c and the signal iBY represented in the two-s complement representation outputted by the conversion circuit 10d and outputs the result i(CX+BY).

From these addition results, the twiddle factor multiplication processing part 270 outputs the processing result of $$T = A \times W(BX-CY) + i(CX+BY).$$

Effects of the Second Example Embodiment

As described, in the present example embodiment, the FFT apparatus 400 achieves rearrangement from the "sequential order" to the "bit reverse order" and rearrangement from the "bit reverse order" to the "sequential order," which are data reordering processing required in a butterfly operation, in two steps through the "intermediate order" after conversion into the sign magnitude—representation. As a result, the percentage-activity of the RAM circuits constituting the first data rearrangement part 201 and the second data rearrangement part 204, the flip-flop circuits, and the selector circuits can be reduced, compared with a case where the reordering processing is performed while remaining in the two's complement representation.

Further, the FFT apparatus 400 processes the multiplication processing, among the multiplication processing and the addition processing that constitute the twiddle factor multiplication processing, while remaining in a sign magnitude—representation. Therefore, the percentage-activity can be reduced as compared with the case where the multiplication process is performed in a two's complement representation.

On the other hand, although the latter addition processing is performed in a two's complement representation, since the circuit scale of the addition circuit is significantly smaller than that of the multiplication circuit, it is possible to reduce the percentage-activity of the twiddle factor multiplication processing part 270 that performs the twiddle factor multiplication processing by the amount that the multiplication process is processed in the sign magnitude—representation.

The conversion processing between the two's complement representation and the sign magnitude—representation can be achieved only with bit inversion processing, and one-addition processing (increment processing), which is necessary in a conventional sign magnitude representation, is not required.

Since bit inversion processing can be achieved only with an XOR circuit(s), it can be achieved with an overwhelmingly small circuit scale, compared with other logic processing circuits and operation processing circuits.

Further, by compensation processing for a value of a sign magnitude—representation, it is possible to reduce an operation error that occurs even if the operation processing such as multiplication or division is operated while remaining in the sign magnitude—representation, and the number of bits to be compensated can be set to an optimum value according to the allowable operation error. As a result, the circuit scale related to the compensation processing can be reduced.

Therefore, in the second example embodiment, even when a signal which frequently changes between positive and negative in the vicinity of a value zero is processed, the percentage-activity in the data reordering processing can be reduced. Thereby it is possible to reduce the power consumption in the data reordering processing part.

On the other hand, in the second example embodiment, the butterfly operation processing is processed in butterfly operation processing part while remaining in a two's complement representation. Therefore, although the percentage-activity related to these operation processes is not reduced, the conversion between the data representation formats does not largely increase the circuit scale unlike the case where the sign magnitude representation is applied. Therefore, the power consumption of the entire FFT apparatus can be reduced by the amount that the power consumption related to the data reordering processing and the twiddle factor multiplication processing is reduced.

Figure 30:
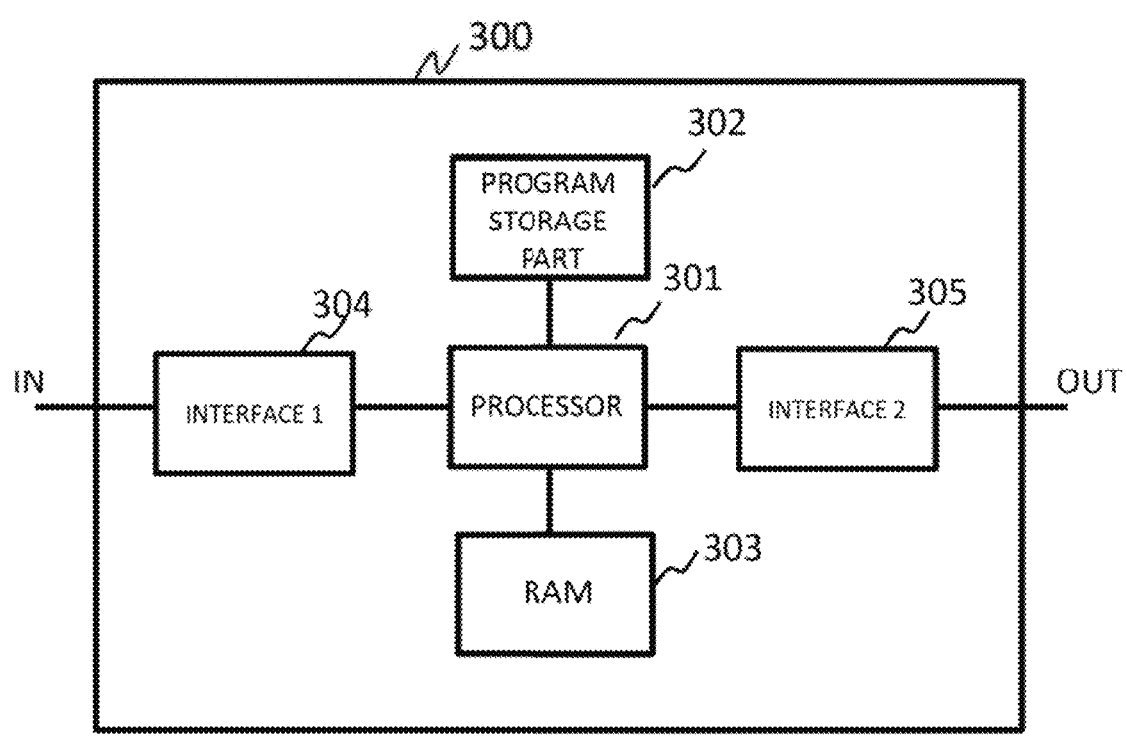
FIG. 30 is a diagram illustrating a mode of a computer program as an example embodiment of the present invention.

FIG. 30 is a diagram schematically illustrating a mode in which a program realizes the processing and functions of the apparatuses 100 and 400 according to the above first and the second example embodiments. Referring to FIG. 30, a processor apparatus 300 comprises a processor 301, a program storage part 302 that stores a program (instructions, data, etc.) executed by the processor 301, a RAM 303 (that may function as the RAM circuit 210 of the second example embodiment illustrated in FIG. 8) to/from which the processor 301 writes/reads data, a first interface (interface 1) 304 that receives input data from an input terminal IN and supplies the data to the processor 301, and a second interface (interface 2) 305 that receives data outputted from the processor 301 and outputs the data from an output terminal OUT. The processor 301 may be a digital signal processor, or the like. The program storage part 302 may be a ROM (Read-Only Memory), EEPROM (Electrically Erasable Programmable Read-Only Memory), HDD (Hard Disk Drive), or USB (Universal Serial Bus) memory, etc. The program storage part 302 may be configured to store the firmware of the processor 301. The RAM 303 may be configured to be built into the processor 301. The first interface 304 may be configured to comprise an input circuit (or receiving circuit) and an input buffer (receiving buffer) and the second interface 305 may be configured to comprise an output buffer (transmission buffer) and an output circuit (transmission circuit). The first and the second interfaces 304 and 305 may be integrated into a single interface circuit comprising an input/output circuit (transceiver). The same effects as those of the first and the second example embodiments can be obtained by causing the processor 301 to execute the program stored in the program storage part 302. Note that FIG. 30 illustrates the configuration of the processor apparatus 300 with the parts 301 to 305 merely for the sake of description, however, it goes without saying that some or all of these parts may be included in the processor 301 to form a single chip.

It is noted that each disclosure of Patent Literatures 1 to 3 and Non-Patent Literatures 1 and 2 cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual examples and the individual elements of the individual figures) within the scope of the Claims of the present invention, That is, it is self-explanatory that the present invention includes any types of variations and modifications to be done by a skilled person according to the whole disclosure including the Claims, and the technical concept of the present invention.

The whole or part of the example embodiments disclosed above can be described as, but not limited to, the following Supplementary Notes.

[Note 1]

A signal processing apparatus, comprising:

a storage processing part that performs storage processing on data represented in a second representation format, wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted; and an operation processing part that performs operation processing on at least one of data represented in the two's complement representation or data obtained by applying compensation processing to data represented in the second representation format.

[Note 2]
The signal processing apparatus according to note 1, wherein the compensation processing adds a value one to M bits from a least significant bit (where M is a positive integer and not more than N) in data of N bits (where N is a predetermined positive integer) when the data of N bits (N being a positive integer) represented in the second representation format has a negative value.

[Note 3]
The signal processing apparatus according to note 1 or 2, wherein the operation processing part performs the operation processing on any of data obtained by applying the compensation processing to data represented in the second representation format when an operation to be processed is a multiplication or a division, and performs the operation processing on data represented in a two's complement representation when an operation to be processed is an addition or a subtraction.

[Note 4]
The signal processing apparatus according to any one of notes 1 to 3, wherein the storage processing part comprises:
at least one selected from:
a configuration including a storage circuit; and
a configuration including a storage circuit and at least one of a first conversion part or a second conversion part,
wherein the first conversion part receives data represented in a two's complement representation to convert the received data from the two's complement representation to the second representation format,
wherein the storage circuit performs storage processing of and outputs the data in the second representation format, and
wherein the second conversion part receives the data represented in the second representation format outputted from the storage circuit to convert the received data into a two's complement representation for output.

[Note 5]
The signal processing apparatus according to any one of notes 1 to 3, wherein the operation processing part comprises:
at least one selected from:
a configuration including a first operation circuit;
a configuration including a compensation circuit and a second operation circuit; and
a configuration including a compensation circuit and a second operation circuit and further comprising at least one of a first conversion part or a second conversion part,
wherein the first operation circuit receives data represented in a two's complement representation and performs operation processing on the data represented in the two's complement representation,
wherein the first conversion part receives data represented in a two's complement representation to convert the received data from the two's complement representation to the second representation format,
wherein the compensation circuit performs the compensation processing on data represented in the second representation format,
wherein the second operation circuit receives data having the compensation processing applied thereto by the compensation circuit and performs operation processing on the data having the compensation processing applied thereto, and
wherein the second conversion part receives data represented in the second representation format and converts the received data to a two's complement representation for output.

[Note 6]
The signal processing apparatus according to note 5, wherein the second operation circuit comprises:
a sign operation circuit that outputs a result of an operation performed on one or more sign bits of one or more individual items of data of operation target in the second representation format with the compensation processing applied thereto, as a sign bit; and
an unsigned operation circuit that performs an operation on one or more magnitude parts other than the one or more sign bits of the one or more individual items of data of operation target represented in the second representation format with the compensation processing applied thereto for output.

[Note 7]
The signal processing apparatus according to any one of notes 4 to 6, wherein the first conversion part and the second conversion part each output a most significant bit of the received data as it is, and
as for each bit other than the most significant bit, output a result of taking exclusive OR of the each bit and the most significant bit.

[Note 8]
The signal processing apparatus according to note 1 or 2, wherein the apparatus performs a fast Fourier transform or an inverse fast Fourier transform using both a two's complement representation and the second representation format as data representation formats, wherein the operation processing part comprises:
a butterfly operation processing part that performs butterfly operation processing; and
a twiddle factor multiplication processing part that performs twiddle factor multiplication processing,
wherein the storage processing part comprises
a data reordering processing part that rearranges an order of a plurality of data,
wherein the butterfly operation processing part performs the butterfly operation processing on data represented in the two's complement representation,
wherein the twiddle factor multiplication processing part performs operation processing on data obtained by applying compensation processing to data represented in the second representation format, for multiplication processing, and performs operation processing on data represented in a two's complement representation, for addition processing, and
wherein the data reordering processing part performs storage processing on data represented in the second representation format.

[Note 9]
The signal processing apparatus according to note 8, wherein the data reordering processing part comprises:
a first conversion part that receives data represented in a two's complement representation and converts it into the second representation format; and a second conversion part that receives data represented in the second representation format and converts it into a two's complement representation,
wherein the first conversion part converts received data represented in a two's complement representation into the second representation format and performs data reordering processing, and
wherein the second conversion part converts data represented in the second representation format with the data reordering applied into a two's complement representation for output.

[Note 10]
The signal processing apparatus according to note 8 or 9, wherein the first conversion part and the second conversion part each output a most significant bit of the received data as it is, and
as for each bit other than the most significant bit, output a result of taking exclusive OR of the each bit and the most significant bit.

[Note 11]
An FFT apparatus performing a fast Fourier transform (FFT) or an inverse fast Fourier transform (IFFT), comprising:
a butterfly operation processing part that performs butterfly operation processing; and
a twiddle factor multiplication processing part that performs twiddle factor multiplication processing; and
a data reordering processing part that rearranges an order of a plurality of data,
wherein the apparatus performs an operation using both a two's complement representation and a second representation format which is different from the two's complement representation, as a data representation format,
wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted,
wherein the butterfly operation processing part performs the processing on data represented in a two's complement representation;
wherein the data reordering processing part performs storage processing on data represented in the second representation format,
wherein the twiddle factor multiplication processing part performs operation processing on data obtained by applying compensation processing to data represented in the second representation format, for multiplication processing, and performs operation processing on data represented in a two's complement representation, for addition processing.

[Note 12]
The FFT apparatus according to note 11, wherein the compensation processing performs processing in which a value one is added to M bits from a least significant bit (where M is a positive integer and not more than N) in data of N bits (where N is a positive integer) when the data of N bits (N being a positive integer) represented in the second representation format has a negative value.

[Note 13]
The FFT apparatus according to note 11 or 12, wherein the data reordering processing part comprises:
a first conversion part that converts data from a two's complement representation to the second representation format; and
a second conversion part that converts data from the second representation format to a two's complement representation, wherein the first conversion part converts received data represented in a two's complement representation into a second representation format and performs data reordering processing,
wherein the second conversion part converts data represented in the second representation format with the data reordering applied into a two's complement representation for output.

[Note 14]
The FFT apparatus according to any one of notes 11 to 13, wherein the first conversion part and the second conversion part each output a most significant bit of the received data as it is, and
as for each bit other than the most significant bit, output a result of taking exclusive OR of the each bit and the most significant bit.

[Note 15]
A signal processing method, comprising steps of:
performing storage processing on data represented in a second representation format that is different from a two's complement representation; and
performing operation processing on at least one of data represented in a two's complement representation or data obtained by applying compensation processing to data represented in the second representation format, wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted.

[Note 16]
The signal processing method according to note 15, comprising
in the compensation processing, adding a value one to M bits from a least significant bit (where M is a positive integer and not more than N) in data of N bits (where N is a predetermined positive integer) when the data of N bits (N being a positive integer) represented in the second representation format has a negative value.

[Note 17]
The signal processing method according to note 15 or 16, comprising:
in the operation processing, performing the operation processing on any of data obtained by applying the compensation processing to data represented in the second representation format when an operation to be processed is a multiplication or a division: and
performing the operation processing on data represented in a two's complement representation when an operation to be processed is an addition or a subtraction.

[Note 18]
The signal processing method according to any one of notes 15 to 17, wherein the storage processing comprises at least one of
storage processing, and
at least one of a first conversion processing or a second conversion processing prior to or behind the storage processing,
the first conversion processing receiving data represented in a two's complement representation to convert the received data from the two's complement representation to the second representation format, the storage processing storing the data in the second representation format into the storage circuit, the second conversion processing receiving the data represented in the second representation format outputted from the storage circuit to convert the received data into a two's complement representation for output.

[Note 19]

The signal processing method according to any one of notes 15 to 17, wherein the operation processing comprises:
at least one selected from:
first operation processing;
compensation processing and a second operation processing; and
compensation processing, second operation processing, and further at least one of first conversion processing or second conversion processing,
wherein the first operation processing receives data represented in a two's complement representation to perform operation processing on the data represented in the two's complement representation,
wherein the first conversion processing receiving data represented in a two's complement representation to convert the received data from the two's complement representation to the second representation format,
wherein the compensation processing performs the compensation processing on data represented in the second representation format,
wherein the second operation processing performs operation processing on the data having the compensation processing applied thereto, and
wherein the second conversion processing receives data represented in the second representation format to convert the received data to a two's complement representation for output.

[Note 20]

The signal processing method according to note 15 or 16, comprising
performing a fast Fourier transform or an inverse fast Fourier transform using both a two's complement representation and the second representation format as data representation format, wherein the operation processing comprises:
butterfly operation processing performing butterfly operation processing; and
twiddle factor multiplication processing performing twiddle factor multiplication processing, to perform a fast Fourier transform or an inverse fast Fourier transform,
wherein the storage processing comprises
data reordering processing rearranging an order of a plurality of data,
wherein the butterfly operation processing performs the butterfly operation processing on data represented in the two's complement representation,
wherein the twiddle factor multiplication processing performs operation processing on data obtained by applying compensation processing to data represented in the second representation format, for multiplication processing, and performs operation processing on data represented in a two's complement representation, for addition processing, and
wherein the data reordering processing performs storage processing on data represented in the second representation format.

[Note 21]

The signal processing method according to note 20, wherein the data reordering processing comprises:
a first conversion processing converting data from a two's complement representation into the second representation format; and
a second conversion processing converting from the second representation format into a two's complement representation,
wherein the first conversion processing converts received data represented in a two's complement representation into the second representation format and performs data reordering processing, and
wherein the second conversion processing converts data represented in the second representation format with the data reordering applied into a two's complement representation for output.

[Note 22]

An FFT operation method for performing a fast Fourier transform (FFT) or an inverse fast Fourier transform (IFFT) comprising
butterfly operation processing performing butterfly operation processing;
twiddle factor multiplication processing performing twiddle factor multiplication processing; and
data reordering processing rearranging an order of a plurality of data, the method comprising:
performing an operation using both a two's complement representation and the second representation format that is different from the two's complement representation as data representation format, wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted,
wherein the butterfly operation processing performs the processing on data represented in the two's complement representation,
wherein the data reordering processing performs storage processing on data represented in the second representation format.
wherein the twiddle factor multiplication processing performs operation processing on data obtained by applying compensation processing to data represented in the second representation format, for multiplication processing, and performs operation processing on data represented in a two's complement representation, for addition processing.

[Note 23]

The FFT operation method according to note 22, comprising the compensation processing adding a value one to NM bits from a least significant bit (where M is a positive integer and not more than N) in data of N bits (where N is a positive integer) when the data of N bits (N being a positive integer) represented in the second representation format has a negative value.

[Note 24]

The FFT operation method according to note 22 or 23, wherein
the data reordering processing comprises:
first conversion processing converting data from a two's complement representation to the second representation format; and second conversion processing converting from the second representation format to a two's complement representation,
    wherein the first conversion processing converts received data represented in a two's complement representation into a second representation format and performs data reordering processing, and
    wherein the second conversion processing converts data subjected to the data reordering processing on data represented in the second representation format into a two's complement representation for output.

[Note 25]

A program causing a computer to execute:
    a storage processing on data represented in a second representation format, wherein, when a value of the data is positive or zero, the second representation format is identical to a representation format of two's complement, while, when the value of the data is negative, the second representation format is a representation format in which all bits other than a most significant bit indicating a sign in a two's complement representation of the data are inverted; and
    an operation processing on at least any one of data represented in the two's complement representation or data obtained by applying compensation processing to data represented in the second representation format.

[Note 26]

The program according to note 25, wherein the compensation processing adds a value one to M bits from a least significant bit (where M is a positive integer and not more than N) in data of N bits (where N is a predetermined positive integer) when the data of N bits (N being a positive integer) represented in the second representation format has a negative value.

[Note 27]

The program according to note 25 or 26, comprising:
    performing the operation processing on any of data obtained by applying the compensation processing to data represented in the second representation format when an operation to be processed is a multiplication or a division; and
    performing the operation processing on data represented in a two's complement representation when an operation to be processed is an addition or a subtraction.

[Note 28]

The program according to any one of notes 25 to 27, wherein the storage processing comprises at least one of:
    storage processing, and
    at least one of a first conversion processing or a second conversion processing prior to or behind the storage processing,
    wherein the first conversion processing receives data represented in a two's complement representation to convert the received data from wherein the two's complement representation to the second representation format,
    wherein the storage processing stores the data represented in the second representation format into the storage circuit, and
    wherein the second conversion processing receives the data represented in the second representation format outputted from the storage circuit to convert the received data into a two's complement representation for output.

[Note 29]

The program according to any one of notes 25 to 27, wherein the operation processing comprises:
    at least one selected from:
    first operation processing;
    compensation processing and second operation processing; and compensation processing and second operation processing, and further at least one of first conversion processing or second conversion processing,
    wherein the first operation processing receives data represented in a two's complement representation to perform operation processing on the data represented in the two's complement representation,
    wherein the first conversion processing receives data represented in a two's complement representation to convert the received data from the two's complement representation to the second representation format,
    wherein the compensation processing performs the compensation processing on data represented in the second representation format,
    wherein the second operation processing performs operation processing on the data having the compensation processing applied thereto, and
    wherein the second conversion processing receives data represented in the second representation format and converts the received data to a two's complement representation for output.

[Note 30]

The program according to note 25 or 26, wherein the operation processing comprises:
    butterfly operation processing that performs butterfly operation processing; and
    twiddle factor multiplication processing that performs twiddle factor multiplication processing to perform a fast Fourier transform or an inverse fast Fourier transform,
    wherein the storage processing comprises data reordering processing that rearranges an order of a plurality of data,
    wherein the butterfly operation processing performs the butterfly operation processing on data represented in the two's complement representation,
    wherein the twiddle factor multiplication processing performs operation processing on data obtained by applying compensation processing to data represented in the second representation format, for multiplication processing, and performs operation processing on data represented in a two's complement representation, for addition processing, and
    wherein the data reordering processing performs storage processing on data represented in the second representation format.

[Note 31]

The program according to note 30, wherein the data reordering processing comprises:
    a first conversion processing that converts data from a two's complement representation into the second representation format; and
    a second conversion processing that converts from the second representation format into a two's complement representation,
    wherein the first conversion processing converts received data represented in a two's complement representation into a second representation format and performs data reordering processing, and
    wherein the second conversion processing converts data represented in the second representation format with the data reordering applied into a two's complement representation for output.

The invention claimed is:

1. A signal processing apparatus performing Fast Fourier Transform or Inverse Fast Fourier Transform, wherein the signal processing apparatus comprises:
a data reordering processing part that performs data reordering on a plurality of pieces of data represented in a second representation format, the data reordering processing part rearranging an order of the plurality of pieces of data using a random access memory, wherein, for each piece of data, when a value of the data is positive or zero, the second representation format is identical to a representation format of two's complement, and when the value of the data is negative, the second representation format is a representation format in which all bits other than a most significant bit indicating a sign in the two's complement representation of the data are inverted;
a butterfly operation processing circuit that performs a butterfly operation on the plurality of pieces of data in the two's complement representation;
a twiddle factor multiplication processing circuit that includes:
an addition operation processing circuit performing addition processing on the plurality of pieces of data represented in the two's complement representation; and
a multiplication operation circuit performing a multiplication operation on the plurality of pieces of data obtained by applying compensation processing to the plurality of pieces of data represented in the second representation format, and
a compensation processing circuit that performs the compensation processing by adding 1 to M bits from a least significant bit, where M is a positive integer and not more than N which is a predetermined positive integer, in data of N bits when the data of N bits represented in the second representation format is of a negative value.

2. The signal processing apparatus according to claim 1, further comprising:
a first conversion circuit that receives the plurality of pieces of data represented in the two's complement representation and converts the received data from the two's complement representation to the second representation format; and
a second conversion circuit that receives the plurality of pieces of data represented in the second representation format and converts the received data into the two's complement representation for output.

3. The signal processing apparatus according to claim 1, comprising:
a sign operation circuit that outputs a result of an operation performed on one or more sign bits of one or more individual items of data of an operation target in the second representation format with the compensation processing applied thereto, as a sign bit; and
an unsigned operation circuit that performs an operation on one or more magnitude parts other than the one or more sign bits of the one or more individual items of data of operation target represented in the second representation format with the compensation processing applied thereto to output a result of the operation as a magnitude part.

4. The signal processing apparatus according to claim 2, wherein the first conversion circuit and the second conversion circuit each output a most significant bit of the received data, and, for each bit other than the most significant bit of the received data, output a result of exclusive OR of the each bit and the most significant bit of the received data.

5. A signal processing apparatus comprising:
a butterfly operation processing circuit that performs butterfly operation processing on a plurality of pieces of data in a two's complement representation, implemented by a hardware processing circuit and/or a signal processor;
a twiddle factor multiplication processing circuit that performs twiddle factor multiplication processing on the plurality of pieces of data implemented by a hardware processing circuit and/or the signal processor;
a data reordering processing part that rearranges an order of the plurality of pieces of data represented in a second representation format, from a sequential order to a bit reverse order or from the bit reverse order to the sequential order,
wherein, for each piece of data, when a value of the data is positive or zero, the second representation format is identical to a representation format of two's complement, and when the value of the data is negative, the second representation format is a representation format in which all bits other than a most significant bit indicating a sign in the two's complement representation of the data are inverted,
wherein the twiddle factor multiplication processing circuit performs multiplication processing on the plurality of pieces of data obtained by applying compensation processing to the plurality of pieces of data represented in the second representation format, and
the twiddle factor multiplication processing circuit performs addition processing on the plurality of pieces of data represented in the two's complement representation.

6. The signal processing apparatus according to claim 5, wherein the data reordering processing part comprises:
a first conversion circuit that receives the plurality of pieces of data represented in the two's complement representation and converts the plurality of pieces of data received into the second representation format; and
a second conversion circuit that receives the plurality of pieces of data represented in the second representation format and converts the plurality of pieces of data received into the two's complement representation,
wherein the first conversion circuit converts the received plurality of pieces of data represented in the two's complement representation into the second representation format to perform data reordering processing on the plurality of pieces of data, and
wherein the second conversion circuit converts the plurality of pieces of data represented in the second representation format with the data reordering processing applied into the two's complement representation for output.

7. The signal processing apparatus according to claim 6, wherein the first conversion circuit and the second conversion circuit output a most significant bit of the received data, and for each bit other than the most significant bit of the received data, output a result of exclusive OR of the each bit and the most significant bit of the received data.

8. The signal processing apparatus according to claim 1, wherein the signal processing apparatus executes N×N (N is a power of 2) points Fast Fourier Transform or Inverse Fast Fourier transform, wherein the data reordering processing part includes first to third data reordering processing parts that each has a random access memory, and the butterfly operation processing circuit includes first and second butterfly operation processing circuits, wherein the first data reordering processing part receives in parallel N pieces of data for N cycles supplied in sequential order, stores the N pieces of data for N cycles in the random access memory thereof, and rearranges the order of the N pieces of data for N cycles into a bit reversal order and outputs the N pieces of resulting data in parallel for N cycles, where the N pieces of data is the plurality of data, the first butterfly operation processing circuit performs butterfly operation on the N pieces of data output in parallel from the first data reordering processing part, the second data reordering processing part receives in parallel the N pieces of data for N cycles output in the sequential order from the first butterfly operation processing circuit, stores the N pieces of data for N cycles in the random access memory thereof and rearranges the order of the N pieces of data for N cycles into the bit reversal order and outputs N pieces of resulting data in parallel for N cycles, the twiddle factor multiplication processing circuit multiplies the N pieces of data obtained by applying the compensation processing to the N pieces of data output from the second data reordering processing part by corresponding twiddle factor coefficients and outputs in parallel N pieces of resulting data, the second butterfly operation processing circuit performs butterfly operation on the N pieces of data output in parallel from the twiddle factor multiplication processing circuit and outputs N pieces of resulting data in parallel, and the third data reordering processing part receives in parallel the N pieces of data for N cycles output in the bit reversal order from the second butterfly operation processing circuit, stores the N pieces of data for N cycles in the random access memory thereof, and rearranges the order of the N pieces of data for N cycles into the sequential order and outputs the N pieces of resulting data in parallel for N cycles.

9. The signal processing apparatus according to claim 5, wherein the signal processing apparatus executes N×N (N is a power of 2) points Fast Fourier Transform or Inverse Fast Fourier transform, wherein the data reordering processing part includes first to third data reordering processing parts that each has a random access memory, and the butterfly operation processing circuit includes first and second butterfly operation processing circuits, the first data reordering processing part receives in parallel N pieces of data for N cycles supplied in sequential order, stores the N pieces of data for N cycles in the random access memory thereof, and rearranges the order of the N pieces of data for N cycles into a bit reversal order and outputs the N pieces of resulting data in parallel for N cycles, where the N pieces of data is the plurality of data, the first butterfly operation processing circuit performs butterfly operation on the N pieces of data output in parallel from the first data reordering processing part, the second data reordering processing part receives in parallel the N pieces of data for N cycles output in the sequential order from the first butterfly operation processing circuit, stores the N pieces of data for N cycles in the random access memory thereof and rearranges the order of the N pieces of data for N cycles into the bit reversal order and outputs N pieces of resulting data in parallel for N cycles, the twiddle factor multiplication processing circuit multiplies the N pieces of data obtained by applying the compensation processing to the N pieces of data output from the second data reordering processing part by corresponding twiddle factor coefficients and outputs in parallel N pieces of resulting data, the second butterfly operation processing circuit performs butterfly operation on the N pieces of data output in parallel from the twiddle factor multiplication processing circuit and outputs N pieces of resulting data in parallel, and the third data reordering processing part receives in parallel the N pieces of data for N cycles output in the bit reversal order from the second butterfly operation processing circuit, stores the N pieces of data for N cycles in the random access memory thereof, and rearranges the order of the N pieces of data for N cycles into the sequential order and outputs the N pieces of resulting data in parallel for N cycles.

10. The signal processing apparatus according to claim 5, comprising
a compensation circuit that performs the compensation processing, the compensation circuit including:
an adder that adds 1 to M bits from a least significant bit, where M is a positive integer and not more than N which is a predetermined positive integer, in data of N bits when the data of N bits represented in the second representation format is of a negative value.

* * * * *